US 11,146,046 B2

(12) United States Patent
Fujioka et al.

(10) Patent No.: US 11,146,046 B2
(45) Date of Patent: Oct. 12, 2021

(54) GAS-INSULATED SWITCHGEAR

(71) Applicant: Mitsubishi Electric Corporation, Tokyo (JP)

(72) Inventors: Masahiro Fujioka, Tokyo (JP); Daisuke Yoshida, Tokyo (JP); Masato Kawahigashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 179 days.

(21) Appl. No.: 16/487,549

(22) PCT Filed: May 19, 2017

(86) PCT No.: PCT/JP2017/018902
§ 371 (c)(1),
(2) Date: Aug. 21, 2019

(87) PCT Pub. No.: WO2018/211707
PCT Pub. Date: Nov. 22, 2018

(65) Prior Publication Data
US 2021/0288477 A1    Sep. 16, 2021

(51) Int. Cl.
*H02B 5/06*      (2006.01)
*H02B 13/035*  (2006.01)
*H02B 13/00*    (2006.01)

(52) U.S. Cl.
CPC ........... *H02B 13/0358* (2013.01); *H02B 5/06* (2013.01); *H02B 13/005* (2013.01)

(58) Field of Classification Search
CPC ................................. H02B 5/06; H02B 13/035
See application file for complete search history.

(56) References Cited

U.S. PATENT DOCUMENTS 4,209,821 A * 6/1980 Kobayashi ............... H02B 1/22
                                                              200/50.27
4,677,525 A * 6/1987 Mitomo .................... H02B 5/06
                                                              361/612
(Continued)

FOREIGN PATENT DOCUMENTS

CH           634177 A5 * 1/1983  ............... H02B 5/06
CN       1238586 A  * 12/1999
(Continued)

OTHER PUBLICATIONS

International Search Report (PCT/ISA/210) with translation, and Written Opinion (PCT/ISA/237) dated Jul. 25, 2017, by the Japan Patent Office as the International Searching Authority for International Application No. PCT/JP2017/018902.

*Primary Examiner* — Robert J Hoffberg
(74) *Attorney, Agent, or Firm* — Buchanan Ingersoll & Rooney PC

(57) ABSTRACT

A gas-insulated switchgear includes: a plurality of circuit breakers extending along a first direction and aligned in rows along a second direction perpendicular to the first direction; one end rising portions raised from one end of the plurality of circuit breakers along a third direction perpendicular to the first direction and the second direction; other end rising portions raised from another end of the plurality of circuit breakers along the third direction; and a plurality of connection busbars connecting the other end rising portions together or connecting the one end rising portions together. Two lines through which the connection busbars pass are set between the one end rising portions and the other end rising portions.

4 Claims, 23 Drawing Sheets

(56) References Cited

U.S. PATENT DOCUMENTS

| | | | | |
|---|---|---|---|---|
| 4,899,250 | A * | 2/1990 | Itai | H02B 1/22 218/46 |
| 5,200,881 | A * | 4/1993 | Itai | H02B 1/22 218/75 |
| 5,991,148 | A * | 11/1999 | Heil | H02B 5/06 218/75 |
| 6,646,861 | B1 * | 11/2003 | Watanabe | H02B 5/06 361/612 |
| 6,664,493 | B2 * | 12/2003 | Yamada | H02B 5/06 218/43 |
| 6,727,454 | B2 * | 4/2004 | Okabe | H02B 5/06 218/43 |
| 7,414,827 | B2 * | 8/2008 | Kashiwa | H02B 5/06 218/90 |
| 7,515,398 | B2 * | 4/2009 | Takao | H02B 5/06 218/75 |
| 8,111,503 | B2 * | 2/2012 | Takeuchi | H02B 5/06 361/618 |
| 8,605,412 | B2 * | 12/2013 | Nakauchi | H02B 5/06 361/602 |

FOREIGN PATENT DOCUMENTS

| | | | | |
|---|---|---|---|---|
| EP | 0190551 | A2 * | 8/1986 | H02B 5/06 |
| JP | 54054251 | A * | 4/1979 | H02B 1/22 |
| JP | 2008029079 | A | 2/2008 | |
| JP | 2012090430 | A | 5/2012 | |
| JP | 2014079116 | A | 5/2014 | |

* cited by examiner

Prior Art

Prior Art

Prior Art

Prior Art

Prior Art

GAS-INSULATED SWITCHGEAR

FIELD

The present invention relates to a 1-1/2CB system gas-insulated switchgear.

BACKGROUND

In a case where the circuit system of a gas-insulated switchgear requires high reliability, what is called a 1-1/2CB ("CB" is the abbreviation of "circuit breaker") system can be adopted. In the 1-1/2CB system, three circuit breakers are connected in series between two main busbars. That is, the 1-1/2CB system is a circuit system that uses three circuit breakers for drawing out two lines so as not to affect the electrical grid in the event of a busbar accident and not to stop the power line when the circuit breakers or the like are inspected.

The fact that the 1-1/2CB system includes three circuit breakers connected in series between two main busbars is problematic because the distance between the two main busbars is so long that the gas-insulated switchgear requires a large installation space. In view of this, Patent Literature 1 discloses a prior art arrangement for the 1-1/2CB system. In Patent Literature 1, circuit breakers are arranged in a direction orthogonal to the longitudinal direction of the main busbars and aligned in rows in the longitudinal direction of the main busbars. With this configuration, the distance between the two main busbars can be shortened, and the installation space for the gas-insulated switchgear can be reduced.

CITATION LIST

Patent Literature

Patent Literature 1: Japanese Patent Application Laid-open No. 2008-29079

SUMMARY

Technical Problem

Patent Literature 1 describes a three-phase gas-insulated switchgear in which three-phase conductors are contained in one tank. There is another type of gas-insulated switchgear called a phase-separated gas-insulated switchgear, in which three-phase conductors are contained in separate tanks. The phase-separated gas-insulated switchgear is large because the busbars, the circuit breakers, and the connection busbars connecting the circuit breakers are contained in separate tanks. When transporting a gas-insulated switchgear using a vehicle that cannot carry the entire gas-insulated switchgear, it is necessary to divide the gas-insulated switchgear. The phase-separated gas-insulated switchgear is larger than the three-phase gas-insulated switchgear and thus needs to be divided into smaller units for transportation, which increases the burden of assembly work at the site where the gas-insulated switchgear is installed. Since it is necessary to raise lead-out busbars leading to transmission lines or the like from the connection busbars, the connection busbars are typically arranged above the main busbars.

The present invention has been made in view of the above, and an object thereof is to obtain a phase-separated gas-insulated switchgear with a reduced size.

Solution to Problem

In order to solve the problems described above and achieve the object, a gas-insulated switchgear according to the present invention includes: first to ninth circuit breakers extending along a first direction and aligned in rows along a second direction perpendicular to the first direction; first to ninth one end rising portions respectively raised from one end of the first to ninth circuit breakers along a third direction perpendicular to the first direction and the second direction; and first to ninth other end rising portions respectively raised from another end of the first to ninth circuit breakers along the third direction. The gas-insulated switchgear further includes: a first connection busbar connecting the first other end rising portion and the fourth other end rising portion; a second connection busbar connecting the second other end rising portion and the fifth other end rising portion; a third connection busbar connecting the third other end rising portion and the sixth other end rising portion; a fourth connection busbar connecting the fourth one end rising portion and the seventh one end rising portion; a fifth connection busbar connecting the fifth one end rising portion and the eighth one end rising portion; and a sixth connection busbar connecting the sixth one end rising portion and the ninth one end rising portion. when a first line parallel to the second direction is set adjacent to each of the one end rising portions on a side farther from each of the other end rising portions, a second line parallel to the second direction is set between each of the one end rising portions and each of the other end rising portions, a third line parallel to the second direction is set closer to each of the other end rising portions than the second line, the third line being set between each of the one end rising portions and each of the other end rising portions, and a fourth line parallel to the second direction is set adjacent to each of the other end rising portions on a side farther from each of the one end rising portions, the first connection busbar passes through the second line, is connected to one side of the first other end rising portion closer to the first one end rising portion, and is connected to one side of the fourth other end rising portion closer to the fourth one end rising portion, the second connection busbar passes through the third line, is connected to one side of the second other end rising portion closer to the second one end rising portion, and is connected to one side of the fifth other end rising portion closer to the fifth one end rising portion, the third connection busbar passes through the fourth line, is connected to one side of the third other end rising portion farther from the third one end rising portion, and is connected to one side of the sixth other end rising portion farther from the sixth one end rising portion, the fourth connection busbar passes through the first line, is connected to one side of the fourth one end rising portion farther from the fourth other end rising portion, and is connected to one side of the seventh one end rising portion farther from the seventh other end rising portion, the fifth connection busbar passes through the second line, is connected to one side of the fifth one end rising portion closer to the fifth other end rising portion, and is connected to one side of the eighth one end rising portion closer to the eighth other end rising portion, and the sixth connection busbar passes through the third line, is connected to one side of the sixth one end rising portion closer to the sixth other end rising portion, and is connected to one side of the ninth one end rising portion closer to the ninth other end rising portion.

Advantageous Effects of Invention

The present invention can achieve the effect of reducing the size of the gas-insulated switchgear.

DESCRIPTION OF EMBODIMENTS

Hereinafter, a gas-insulated switchgear according to an embodiment of the present invention will be described in detail based on the drawings. The present invention is not limited to the embodiment.

First Embodiment

Figure 1:
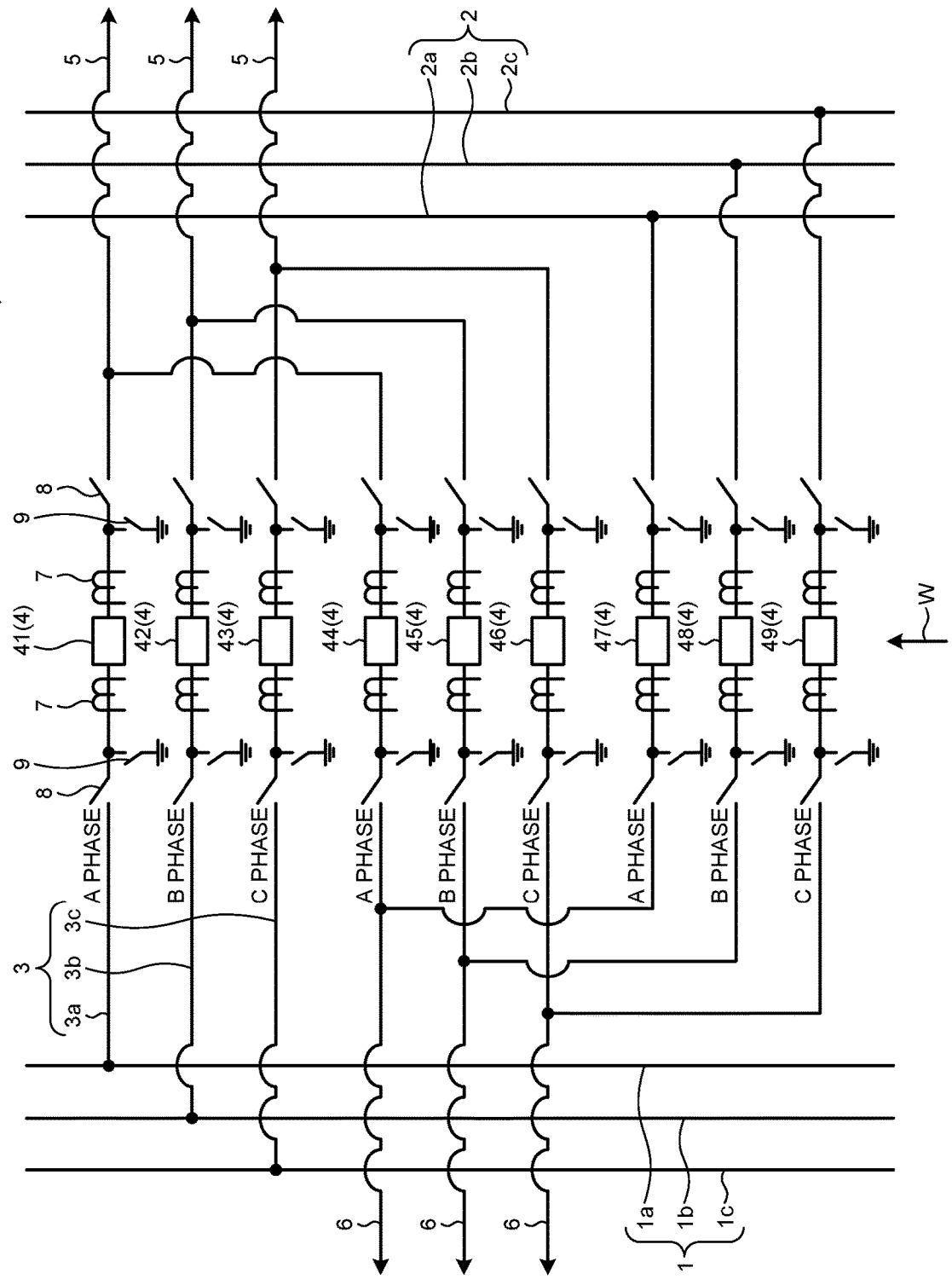
FIG. 1 is a skeleton diagram schematically illustrating a gas-insulated switchgear according to a first embodiment of the present invention.

FIG. 1 is a skeleton diagram schematically illustrating a gas-insulated switchgear according to the first embodiment of the present invention. What is called a 1-1/2CB system is adopted for the gas-insulated switchgear 50 according to the first embodiment. In the 1-1/2CB system gas-insulated switchgear 50, two main busbars 1 and 2 are coupled by a connection busbar 3. In the middle of one connection busbar 3, three circuit breakers 4 are arranged in series. Lead-out busbars 5 and 6 branch from the connection busbars 3 between the circuit breakers 4. The lead-out busbars 5 and 6 are connected to transmission lines or transformers (not illustrated). On both sides of each of the circuit breakers 4 provided in the middle of the connection busbars 3, instrument current transformers 7, disconnectors 8, and ground switches 9 are provided. The circuit breakers 4 each include a cylindrical portion filled with an insulating arc-extinguishing gas exemplified by $SF_6$ and a cutoff portion (not illustrated) provided inside the cylindrical portion.

The gas-insulated switchgear 50 according to the first embodiment is a phase-separated gas-insulated switchgear in which three-phase conductors are contained in separate tanks. Therefore, the main busbars 1 include an A-phase main busbar 1a which is a first main busbar, a B-phase main busbar 1b which is a second main busbar, and a C-phase main busbar 1c which is a third main busbar. The main busbars 2 include an A-phase main busbar 2a which is a fourth main busbar, a B-phase main busbar 2b which is a fifth main busbar, and a C-phase main busbar 2c which is a sixth main busbar. The connection busbars 3 include a connection busbar 3a connecting the A-phase main busbars 1a and 2a, a connection busbar 3b connecting the B-phase main busbars 1b and 2b, and a connection busbar 3c connecting the C-phase main busbars 1c and 2c. Each of the connection busbars 3a, 3b, and 3c is equipped with the circuit breakers 4, the lead-out busbars 5 and 6, the instrument current transformers 7, the disconnectors 8, and the ground switches 9.

Figure 2:
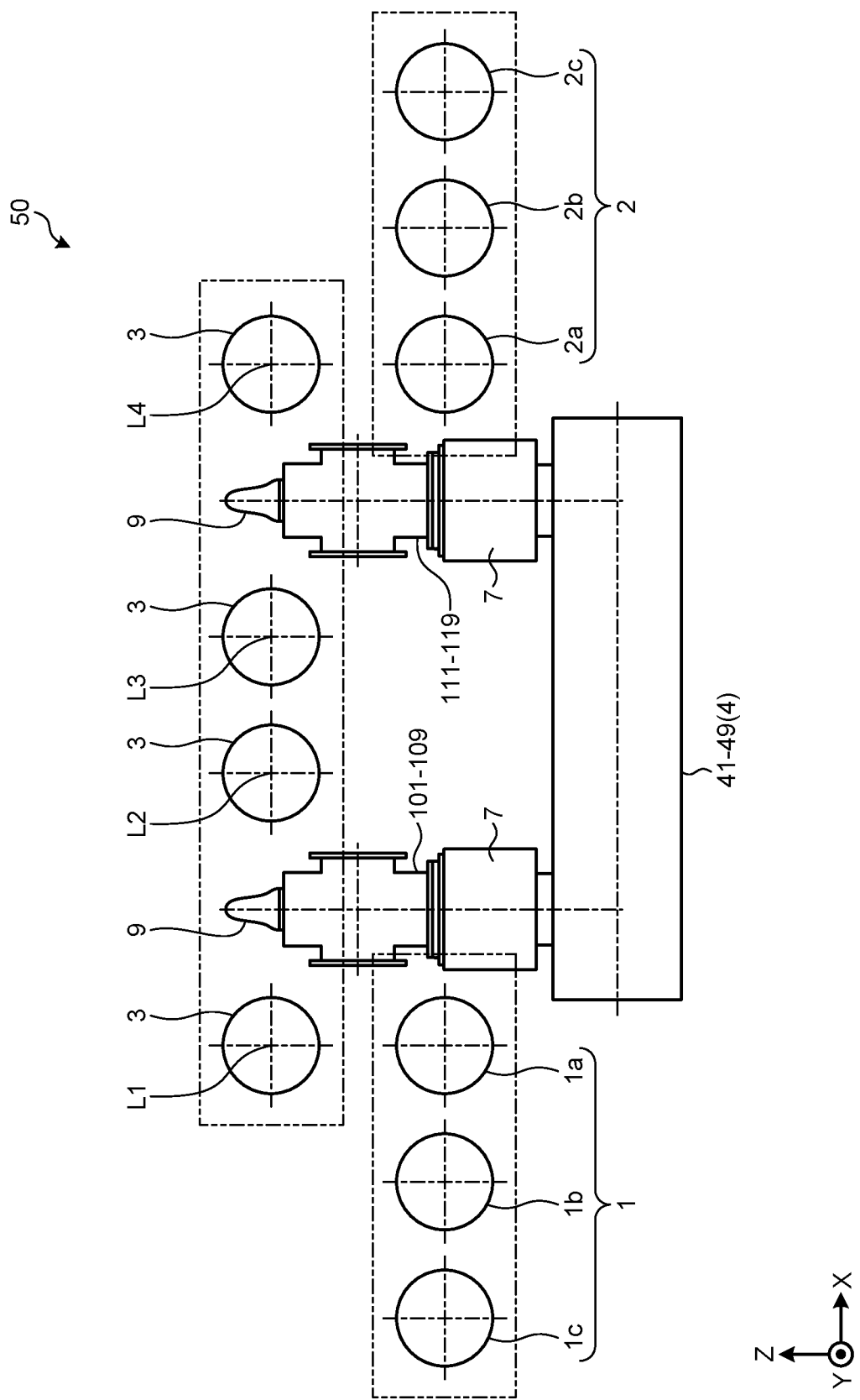
FIG. 2 is a diagram conceptually illustrating a schematic configuration of the gas-insulated switchgear as viewed along arrow W illustrated in FIG. 1.

Next, a detailed configuration of the gas-insulated switchgear 50 will be described. FIG. 2 is a diagram conceptually illustrating a schematic configuration of the gas-insulated switchgear 50 as viewed along arrow W illustrated in FIG. 1. As illustrated in FIG. 2, the A-phase main busbar 1a, the B-phase main busbar 1b, and the C-phase main busbar 1c, which are the main busbars 1, are provided on one side of the circuit breakers 4. The main busbars 1 are arranged such that the A-phase main busbar 1a is closer to the circuit breakers 4 than the B-phase main busbar 1b and the C-phase main busbar 1c are and that the C-phase main busbar 1c is farther from the circuit breakers 4 than the A-phase main busbar 1a and the B-phase main busbar 1b are. The A-phase main busbar 2a, the B-phase main busbar 2b, and the C-phase main busbar 2c, which are the main busbars 2, are provided on the other side of the circuit breakers 4. The main busbars 2 are arranged such that the A-phase main busbar 2a is closer to the circuit breakers 4 than the B-phase main busbar 2b and the C-phase main busbar 2c are and that the C-phase main busbar 2c is farther from the circuit breakers 4 than the A-phase main busbar 2a and the B-phase main busbar 2b are. The A-phase main busbars 1a and 2a, the B-phase main busbars 1b and 2b, and the C-phase main busbars 1c and 2c extend along the Y-axis. In the gas-insulated switchgear 50, the layer including the main busbars 1 and 2 and the layer including the connection busbars 3 are separated in the vertical direction.

Figure 3:
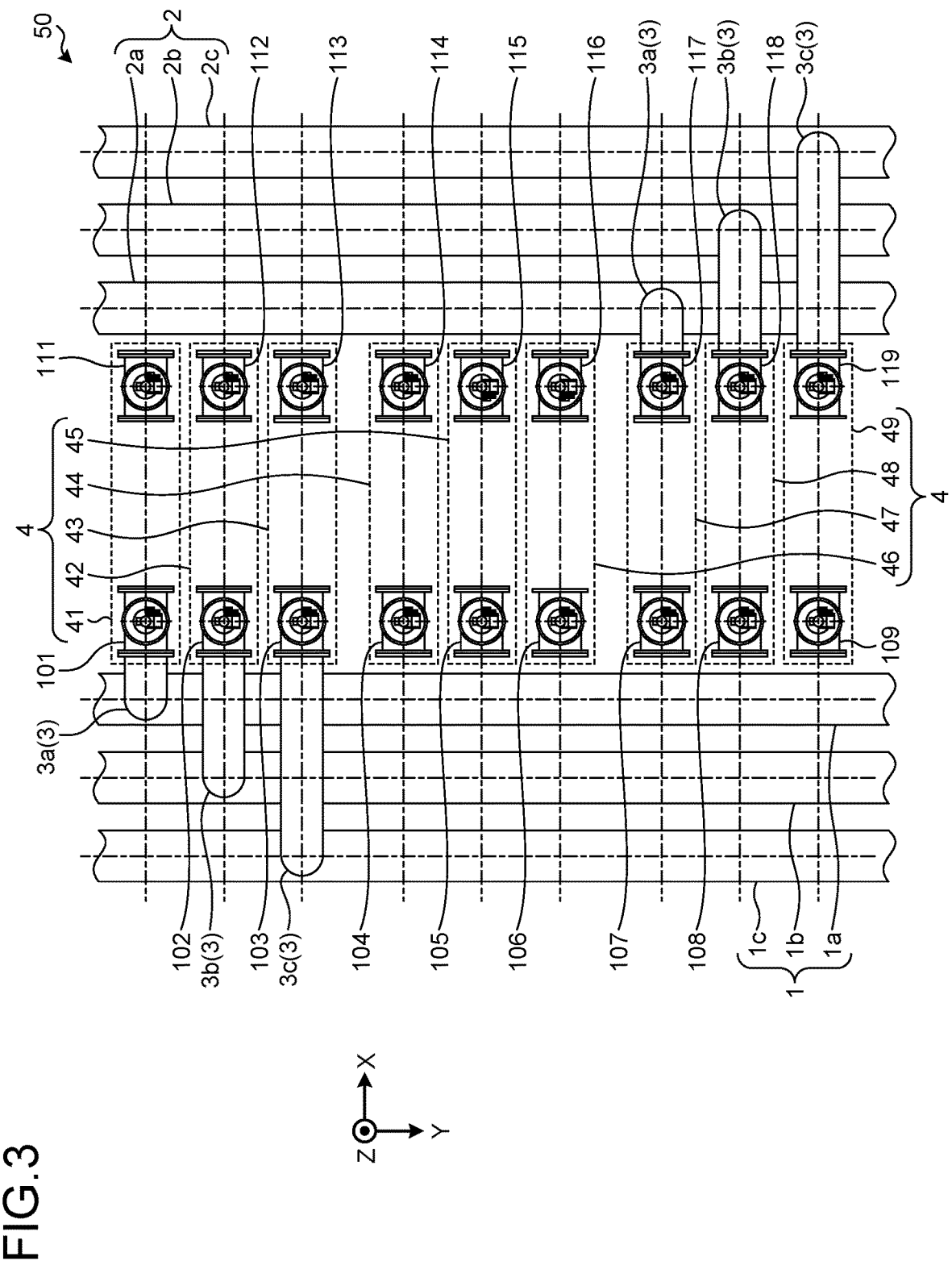
FIG. 3 is a plan view of the gas-insulated switchgear illustrated in FIG. 2, mainly illustrating the layer including main busbars.
Figure 4:
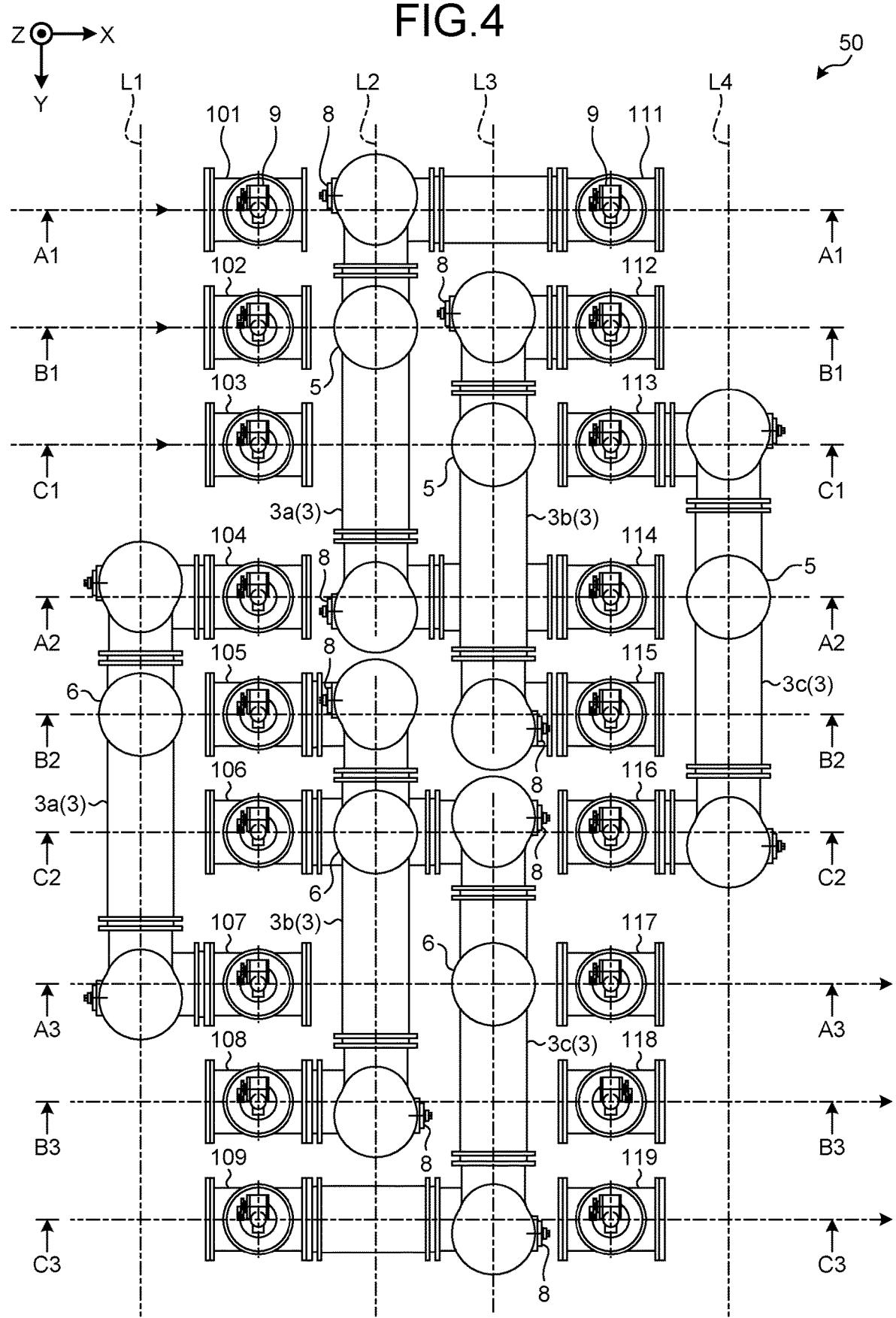
FIG. 4 is a plan view of the gas-insulated switchgear illustrated in FIG. 2, mainly illustrating the layer including connection busbars.

FIG. 3 is a plan view of the gas-insulated switchgear 50 illustrated in FIG. 2, mainly illustrating the layer including the main busbars 1 and 2. FIG. 4 is a plan view of the gas-insulated switchgear 50 illustrated in FIG. 2, mainly illustrating the layer including the connection busbars 3. The circuit breakers 4 are indicated by broken lines in FIG. 3 for ease of understanding. The circuit breakers 4 are omitted from FIG. 4 for ease of understanding. Note that the X-axis, the Y-axis, and the Z-axis are defined as follows. The Y-axis is an axis perpendicular to the X-axis, and the Z-axis is an axis perpendicular to the X-axis and the Y-axis. The direction along the X-axis is a first direction, the direction along the Y-axis is a second direction, and the direction along the Z-axis is a third direction. The positive direction side of the X-axis is the right side, and the negative direction side of the X-axis is the left side. The positive direction side of the Z-axis is the upper side, and the negative direction side of the Z-axis is the lower side.

As illustrated in FIGS. 2, 3, and 4, the circuit breakers 4 extend in the direction along the X-axis. As illustrated in FIG. 3, the circuit breakers 4 include a first circuit breaker 41, a second circuit breaker 42, a third circuit breaker 43, a fourth circuit breaker 44, a fifth circuit breaker 45, a sixth circuit breaker 46, a seventh circuit breaker 47, an eighth circuit breaker 48, and a ninth circuit breaker 49 aligned in rows along the Y-axis.

At one end of the first circuit breaker 41, a first one end rising portion 101 raised along the Z-axis is provided. At the other end of the first circuit breaker 41, a first other end rising portion 111 raised along the Z-axis is provided. At one end of the second circuit breaker 42, a second one end rising portion 102 raised along the Z-axis is provided. At the other end of the second circuit breaker 42, a second other end rising portion 112 raised along the Z-axis is provided. At one end of the third circuit breaker 43, a third one end rising portion 103 raised along the Z-axis is provided. At the other end of the third circuit breaker 43, a third other end rising portion 113 raised along the Z-axis is provided. At one end of the fourth circuit breaker 44, a fourth one end rising portion 104 raised along the Z-axis is provided. At the other end of the fourth circuit breaker 44, a fourth other end rising portion 114 raised along the Z-axis is provided. At one end of the fifth circuit breaker 45, a fifth one end rising portion 105 raised along the Z-axis is provided. At the other end of the fifth circuit breaker 45, a fifth other end rising portion 115 raised along the Z-axis is provided. At one end of the sixth circuit breaker 46, a sixth one end rising portion 106 raised along the Z-axis is provided. At the other end of the sixth circuit breaker 46, a sixth other end rising portion 116 raised along the Z-axis is provided. At one end of the seventh circuit breaker 47, a seventh one end rising portion 107 raised along the Z-axis is provided. At the other end of the seventh circuit breaker 47, a seventh other end rising portion 117 raised along the Z-axis is provided. At one end of the eighth circuit breaker 48, an eighth one end rising portion 108 raised along the Z-axis is provided. At the other end of the eighth circuit breaker 48, an eighth other end rising portion 118 raised along the Z-axis is provided. At one end of the ninth circuit breaker 49, a ninth one end rising portion 109 raised along the Z-axis is provided. At the other end of the ninth circuit breaker 49, a ninth other end rising portion 119 raised along the Z-axis is provided.

Figure 5:
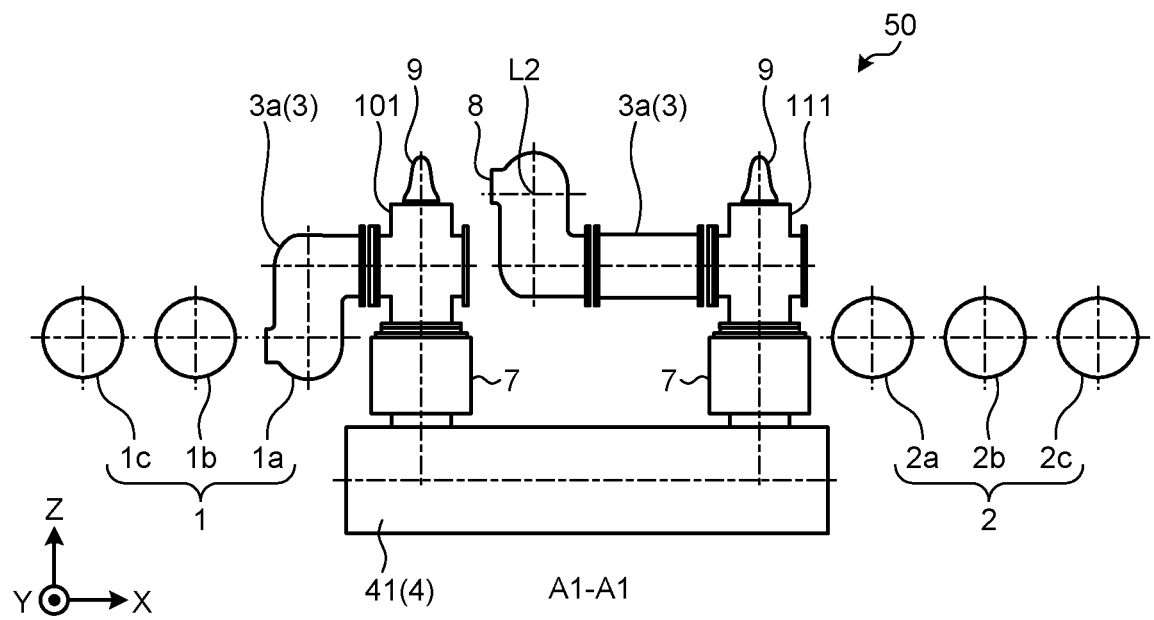
FIG. 5 is a cross-sectional view taken along line A1-A1 illustrated in FIG. 4.
Figure 6:
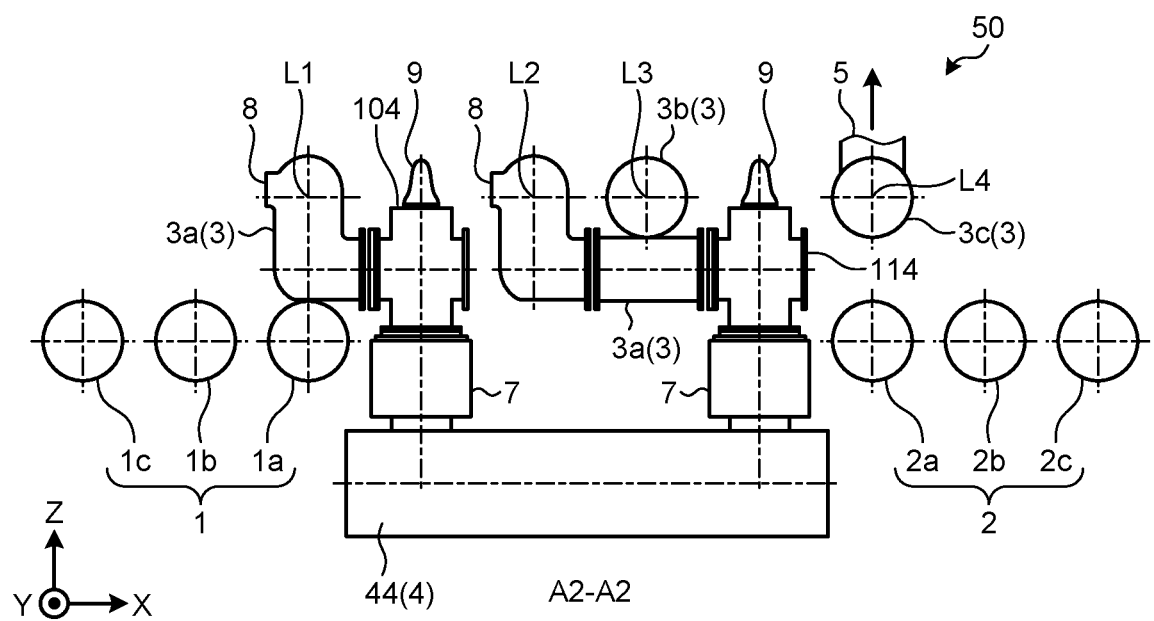
FIG. 6 is a cross-sectional view taken along line A2-A2 illustrated in FIG. 4.
Figure 7:
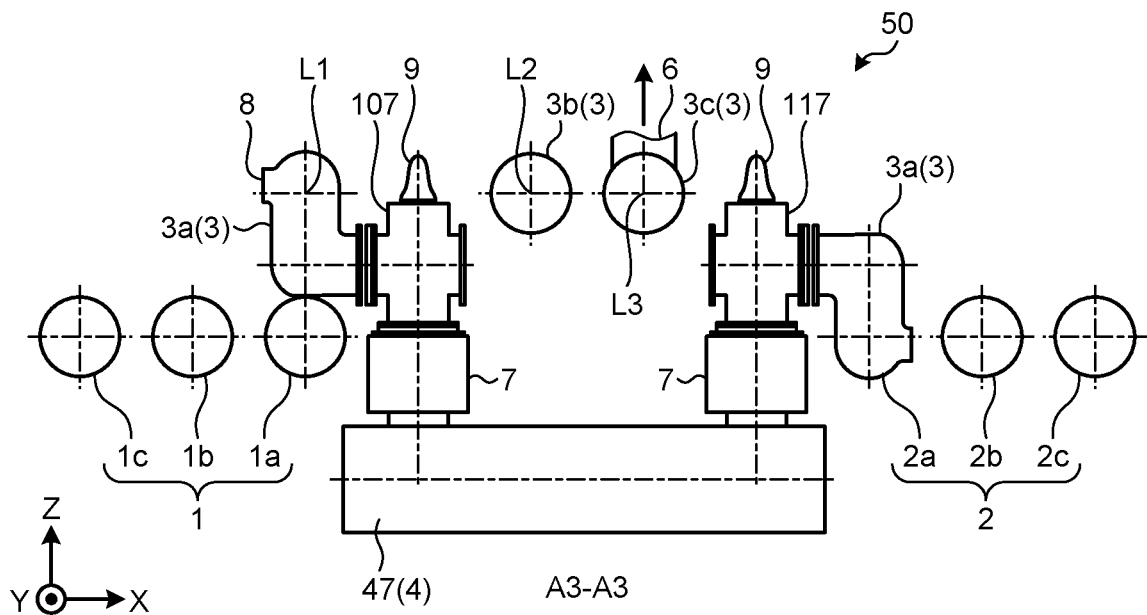
FIG. 7 is a cross-sectional view taken along line A3-A3 illustrated in FIG. 4.
Figure 8:
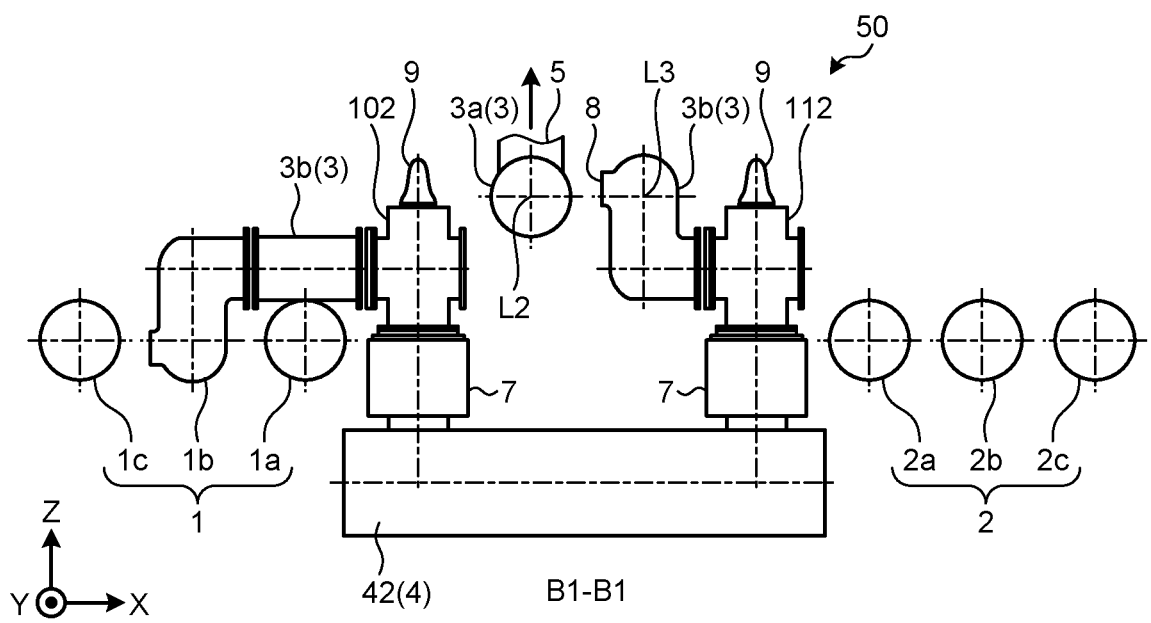
FIG. 8 is a cross-sectional view taken along line B1-B1 illustrated in FIG. 4.
Figure 9:
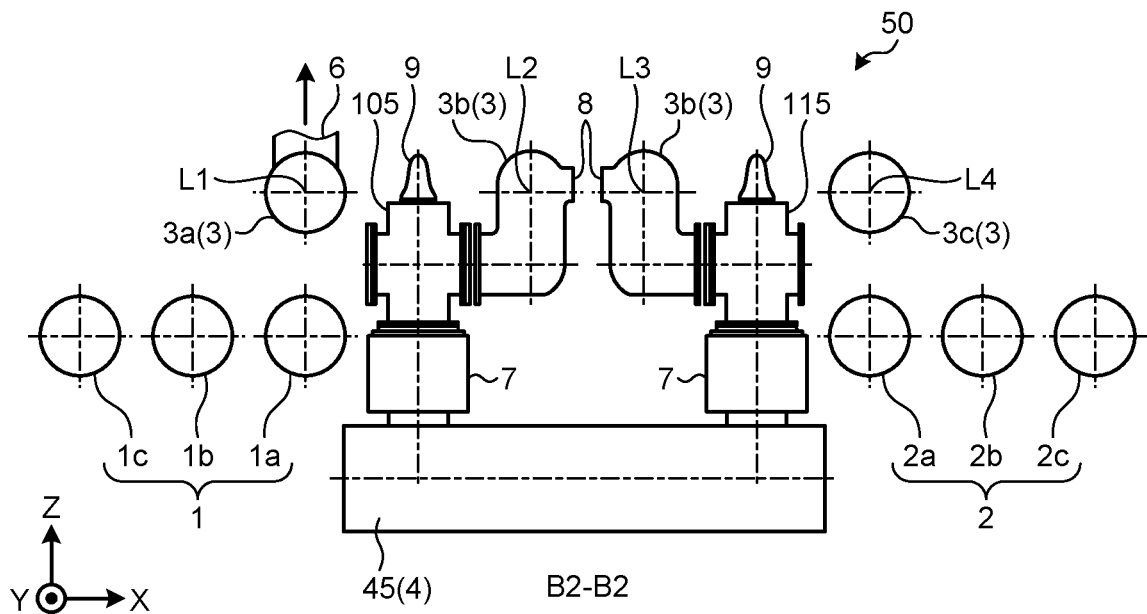
FIG. 9 is a cross-sectional view taken along line B2-B2 illustrated in FIG. 4.
Figure 10:
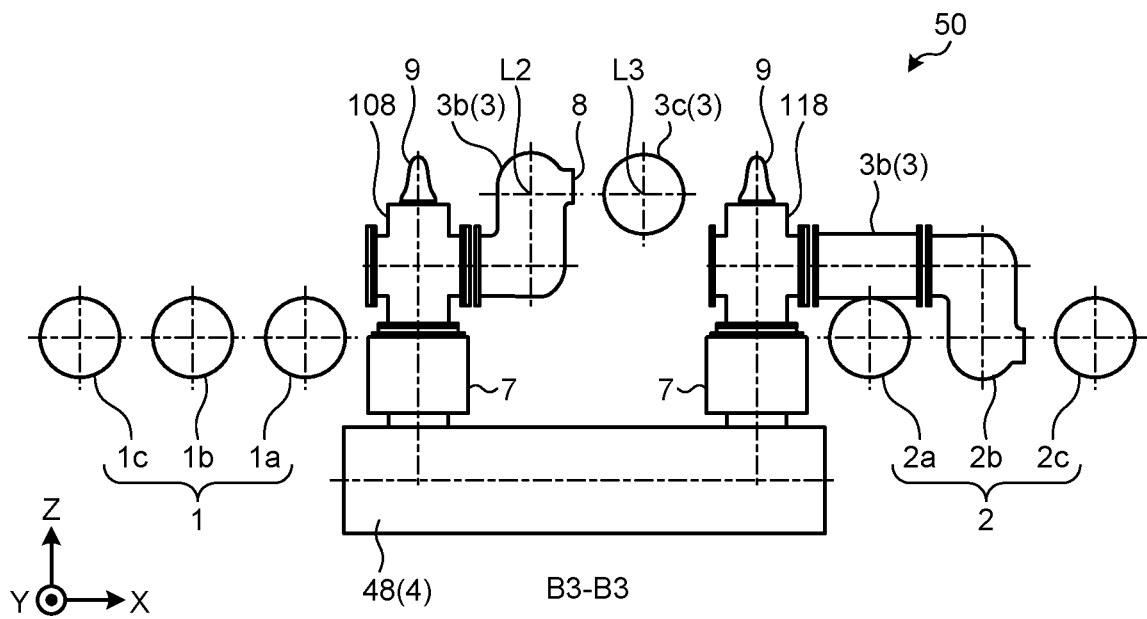
FIG. 10 is a cross-sectional view taken along line B3-B3 illustrated in FIG. 4.
Figure 11:
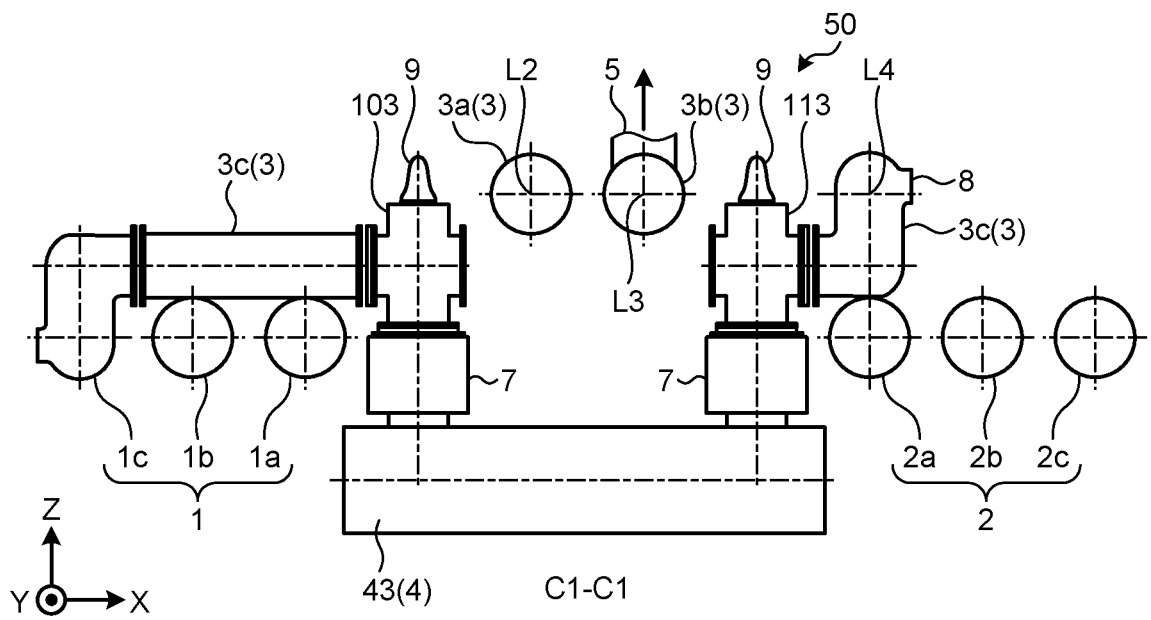
FIG. 11 is a cross-sectional view taken along line C1-C1 illustrated in FIG. 4.
Figure 12:
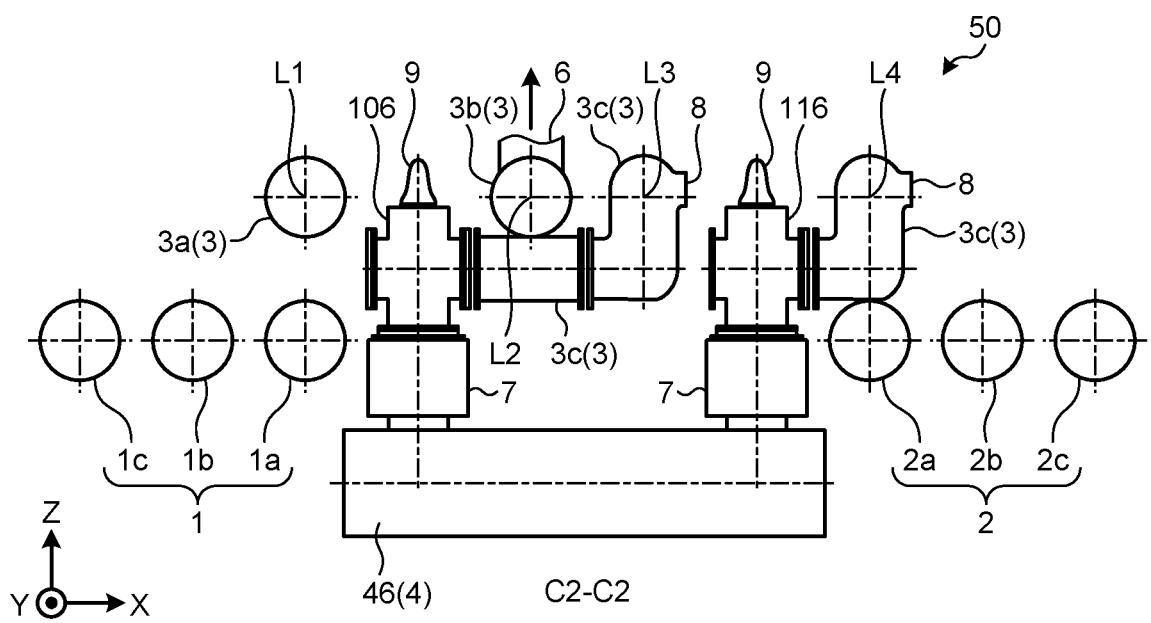
FIG. 12 is a cross-sectional view taken along line C2-C2 illustrated in FIG. 4.
Figure 13:
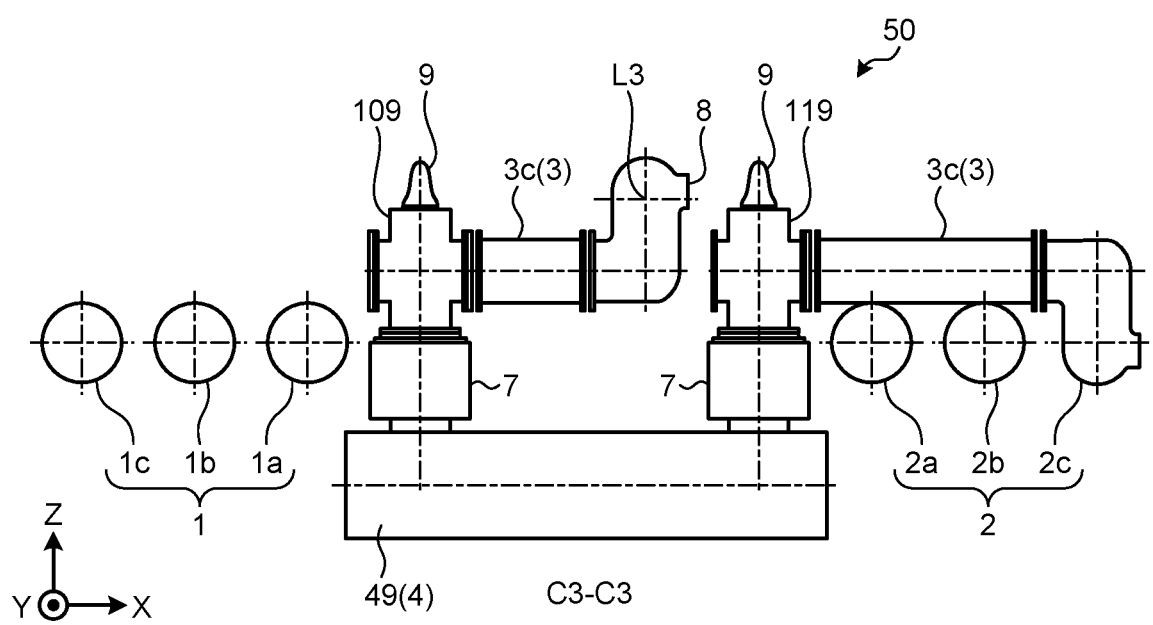
FIG. 13 is a cross-sectional view taken along line C3-C3 illustrated in FIG. 4.

FIG. 5 is a cross-sectional view taken along line A1-A1 illustrated in FIG. 4. FIG. 6 is a cross-sectional view taken along line A2-A2 illustrated in FIG. 4. FIG. 7 is a cross-sectional view taken along line A3-A3 illustrated in FIG. 4. FIG. 8 is a cross-sectional view taken along line B1-B1 illustrated in FIG. 4. FIG. 9 is a cross-sectional view taken along line B2-B2 illustrated in FIG. 4. FIG. 10 is a cross-sectional view taken along line B3-B3 illustrated in FIG. 4. FIG. 11 is a cross-sectional view taken along line C1-C1 illustrated in FIG. 4. FIG. 12 is a cross-sectional view taken along line C2-C2 illustrated in FIG. 4. FIG. 13 is a cross-sectional view taken along line C3-C3 illustrated in FIG. 4. Note that hatching lines are not drawn on the cross-sectional views for ease of understanding.

As illustrated in FIGS. 5 to 13, the instrument current transformer 7 and the ground switch 9 are provided on each of the first to ninth one end rising portions 101-109 and the first to ninth other end rising portions 111-119.

Next, the paths of the connection busbars 3 will be described. For describing the paths of the connection busbars 3, four lines parallel to the Y-axis are virtually defined. First, a first line L1 parallel to the Y-axis is set adjacent to each of the one end rising portions 101-109 on the side farther from each of the other end rising portions 111-119. That is, the first line L1 is set on the left side of each of the one end rising portions 101-109. A second line L2 parallel to the Y-axis is set between each of the one end rising portions 101-109 and each of the other end rising portions 111-119. A third line L3 parallel to the Y-axis is set closer to each of the other end rising portions 111-119 than the second line L2 is between each of the one end rising portions 101-109 and each of the other end rising portions 111-119. That is, the third line L3 is set on the right side of the second line L2. A fourth line L4 parallel to the Y-axis is set adjacent to each of the other end rising portions 111-119 on the side farther from each of the one end rising portions 101-109. That is, the fourth line L4 is set on the right side of each of the other end rising portions 111-119. The first to fourth lines L1-L4 are set above the main busbars 1 and 2 and above the points of connection between the one end rising portions 101-109 and the connection busbars 3 and the points of connection between the other end rising portions 111-119 and the connection busbars 3.

First, the path of the connection busbar 3a connecting the A-phase main busbars 1a and 2a will be described. As illustrated in FIG. 5, the connection busbar 3a branching from the A-phase main busbar 1a is connected to the left side of the first one end rising portion 101.

The connection busbar 3a connected to the first one end rising portion 101 passes through the first circuit breaker 41 and is pulled out from the left side of the first other end rising portion 111. As illustrated in FIGS. 4 and 5, the connection busbar 3a, which is a first connection busbar pulled out from the left side of the first other end rising portion 111, passes through the second line L2 except above the first circuit breaker 41 and the fourth circuit breaker 44 to connect the first other end rising portion 111 and the fourth other end rising portion 114. As illustrated in FIG. 6, the connection busbar 3a connecting the first other end rising portion 111 and the fourth other end rising portion 114 is connected to the left side of the fourth other end rising portion 114. Two disconnectors 8 are provided on the connection busbar 3a connecting the first other end rising portion 111 and the fourth other end rising portion 114. As illustrated in FIG. 8, the lead-out busbar 5 branches from the connection busbar 3a passing through the second line L2.

As illustrated in FIGS. 4 and 6, the connection busbar 3a connected to the fourth other end rising portion 114 passes through the fourth circuit breaker 44 and is pulled out from the left side of the fourth one end rising portion 104. The connection busbar 3a, which is a fourth connection busbar pulled out from the left side of the fourth one end rising portion 104, passes through the first line L1 to connect the fourth one end rising portion 104 and the seventh one end rising portion 107. As illustrated in FIG. 7, the connection busbar 3a connecting the fourth one end rising portion 104 and the seventh one end rising portion 107 is connected to the left side of the seventh one end rising portion 107. Two disconnectors 8 are provided on the connection busbar 3a connecting the fourth one end rising portion 104 and the seventh one end rising portion 107. As illustrated in FIG. 9, the lead-out busbar 6 branches from the connection busbar 3a passing through the first line L1.

As illustrated in FIG. 7, the connection busbar 3a connected to the seventh one end rising portion 107 passes through the seventh circuit breaker 47 and is pulled out from the right side of the seventh other end rising portion 117 to be connected to the A-phase main busbar 2a.

Next, the path of the connection busbar 3b connecting the B-phase main busbars 1b and 2b will be described. As illustrated in FIG. 8, the connection busbar 3b branching from the B-phase main busbar 1b is connected to the left side of the second one end rising portion 102.

The connection busbar 3b connected to the second one end rising portion 102 passes through the second circuit breaker 42 and is pulled out from the left side of the second other end rising portion 112. As illustrated in FIGS. 4 and 8, the connection busbar 3b, which is a second connection busbar pulled out from the left side of the second other end rising portion 112, passes through the third line L3 except above the second circuit breaker 42 and the fifth circuit breaker 45 to connect the second other end rising portion 112 and the fifth other end rising portion 115. As illustrated in FIG. 9, the connection busbar 3b connecting the second other end rising portion 112 and the fifth other end rising portion 115 is connected to the left side of the fifth other end rising portion 115. Two disconnectors 8 are provided on the connection busbar 3b connecting the second other end rising portion 112 and the fifth other end rising portion 115. As illustrated in FIG. 11, the lead-out busbar 5 branches from the connection busbar 3b passing through the third line L3.

As illustrated in FIGS. 4 and 9, the connection busbar 3b connected to the fifth other end rising portion 115 passes through the fifth circuit breaker 45 and is pulled out from the right side of the fifth one end rising portion 105. The connection busbar 3b, which is a fifth connection busbar pulled out from the right side of the fifth one end rising portion 105, passes through the second line L2 to connect the fifth one end rising portion 105 and the eighth one end rising portion 108. As illustrated in FIG. 10, the connection busbar 3b connecting the fifth one end rising portion 105 and the eighth one end rising portion 108 is connected to the right side of the eighth one end rising portion 108. Two disconnectors 8 are provided on the connection busbar 3b connecting the fifth one end rising portion 105 and the eighth one end rising portion 108. As illustrated in FIG. 12, the lead-out busbar 6 branches from the connection busbar 3b passing through the second line L2.

As illustrated in FIG. 10, the connection busbar 3b connected to the eighth one end rising portion 108 passes through the eighth circuit breaker 48 and is pulled out from the right side of the eighth other end rising portion 118 to be connected to the B-phase main busbar 2b.

Next, the path of the connection busbar 3c connecting the C-phase main busbars 1c and 2c will be described. As illustrated in FIG. 11, the connection busbar 3c branching from the C-phase main busbar 1c is connected to the left side of the third one end rising portion 103.

The connection busbar 3c connected to the third one end rising portion 103 passes through the third circuit breaker 43 and is pulled out from the right side of the third other end rising portion 113. As illustrated in FIGS. 4 and 11, the connection busbar 3c, which is a third connection busbar pulled out from the right side of the third other end rising portion 113, passes through the fourth line L4 to connect the third other end rising portion 113 and the sixth other end rising portion 116. As illustrated in FIG. 12, the connection busbar 3c connecting the third other end rising portion 113 and the sixth other end rising portion 116 is connected to the right side of the sixth other end rising portion 116. Two disconnectors 8 are provided on the connection busbar 3c connecting the third other end rising portion 113 and the sixth other end rising portion 116. As illustrated in FIG. 6, the lead-out busbar 5 branches from the connection busbar 3c passing through the fourth line L4.

As illustrated in FIGS. 4 and 12, the connection busbar 3c connected to the sixth other end rising portion 116 passes through the sixth circuit breaker 46 and is pulled out from the right side of the sixth one end rising portion 106. The connection busbar 3c, which is a sixth connection busbar pulled out from the right side of the sixth one end rising portion 106, passes through the third line L3 except above the sixth circuit breaker 46 and the ninth circuit breaker 49 to connect the sixth one end rising portion 106 and the ninth one end rising portion 109. As illustrated in FIG. 13, the connection busbar 3*c* connecting the sixth one end rising portion 106 and the ninth one end rising portion 109 is connected to the right side of the ninth one end rising portion 109. Two disconnectors 8 are provided on the connection busbar 3*c* connecting the sixth one end rising portion 106 and the ninth one end rising portion 109. As illustrated in FIG. 7, the lead-out busbar 6 branches from the connection busbar 3*c* passing through the third line L3.

As illustrated in FIG. 13, the connection busbar 3*c* connected to the ninth one end rising portion 109 passes through the ninth circuit breaker 49 and is pulled out from the right side of the ninth other end rising portion 119 to be connected to the C-phase main busbar 2*c*.

According to the paths of the connection busbars 3*a*-3*c* described above, all the connection busbars 3 are located along the four lines, namely the first to fourth lines L1-L4, as illustrated in the conceptual diagram of FIG. 2. The second line L2 and the third line L3 of the first to fourth lines L1-L4 are provided between each of the one end rising portions 101-109 and each of the other end rising portions 111-119.

Note that each of the one end rising portions 101-109 and the other end rising portions 111-119 can receive a connection busbar 3 on either side, so that the connection busbar 3 can be connected to either the left side or the right side of the rising portion. Therefore, component commonality can be enhanced, and the manufacturing cost of the gas-insulated switchgear 50 can be reduced.

Figure 14:
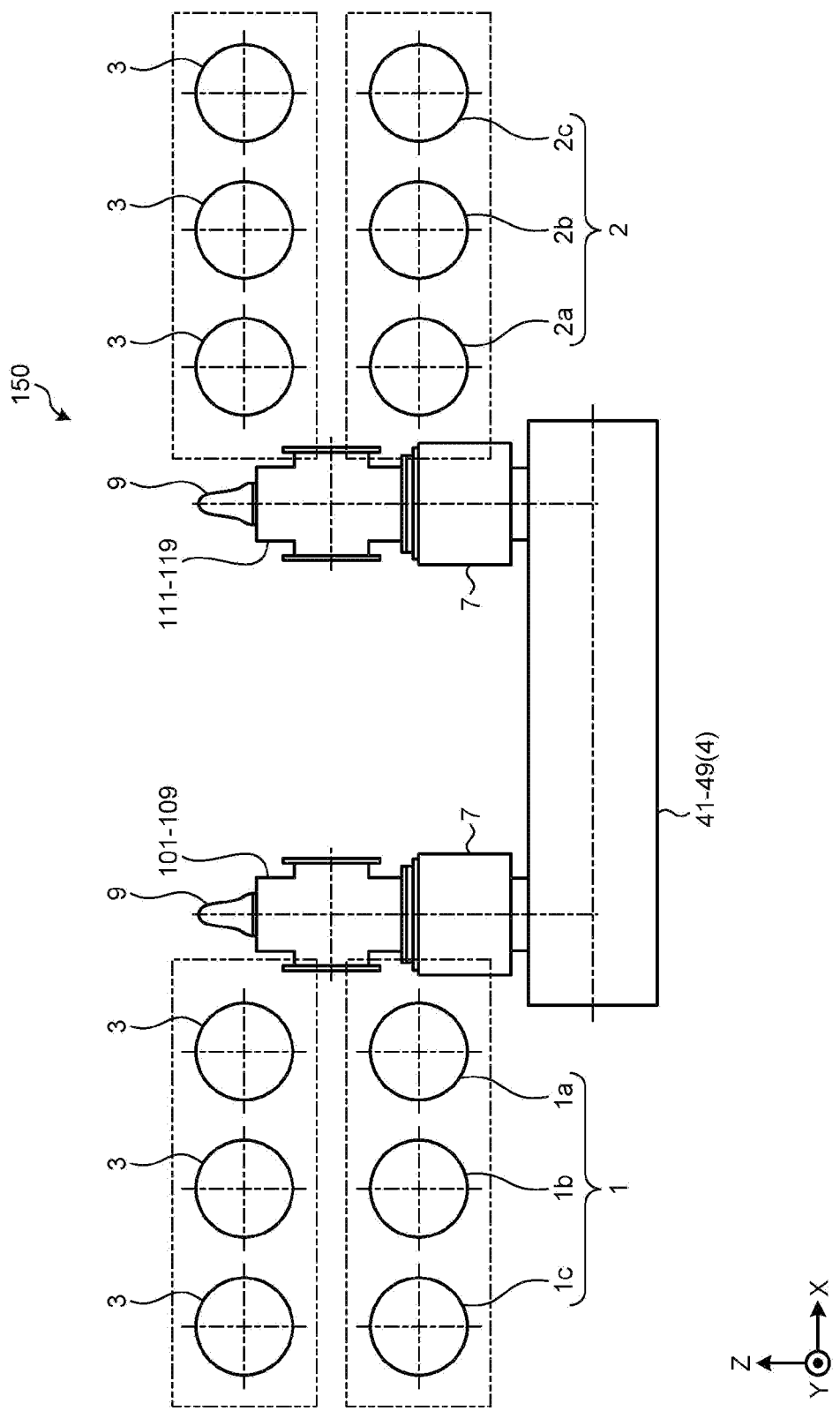
FIG. 14 is a diagram conceptually illustrating a schematic configuration of a gas-insulated switchgear according to a comparative example.
Figure 15:
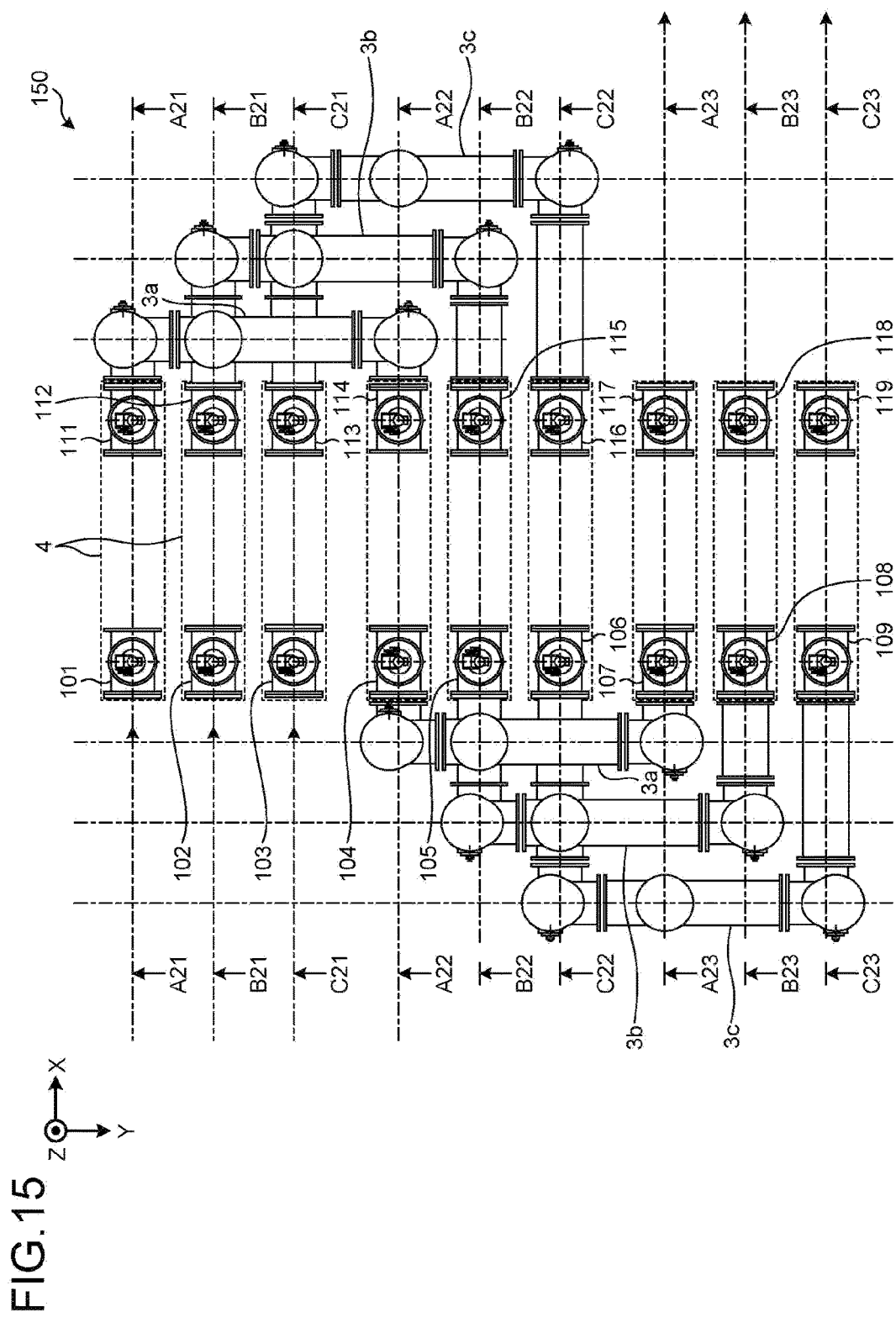
FIG. 15 is a plan view of the gas-insulated switchgear illustrated in FIG. 14, mainly illustrating the layer including connection busbars.
Figure 16:
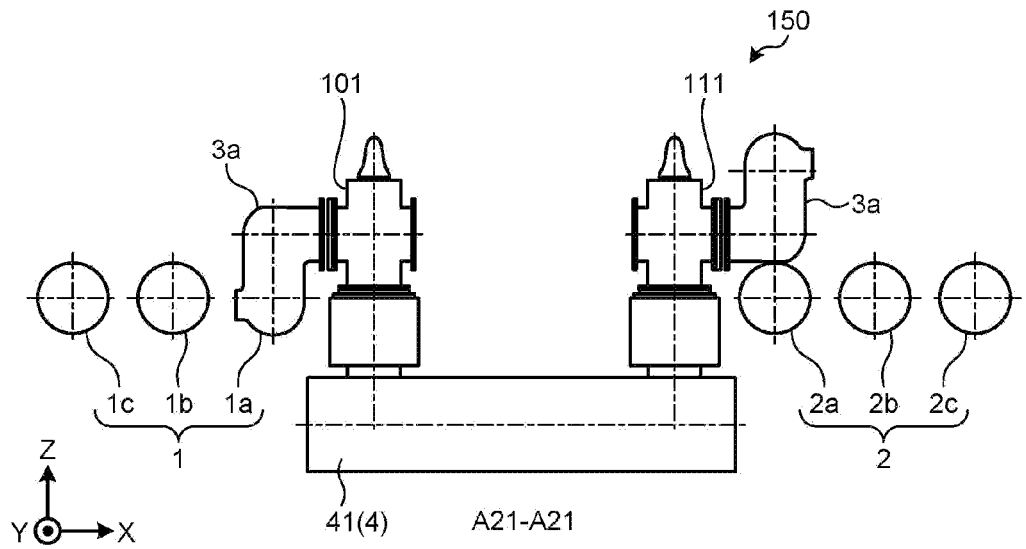
FIG. 16 is a cross-sectional view taken along line A21-A21 illustrated in FIG. 15.
Figure 17:
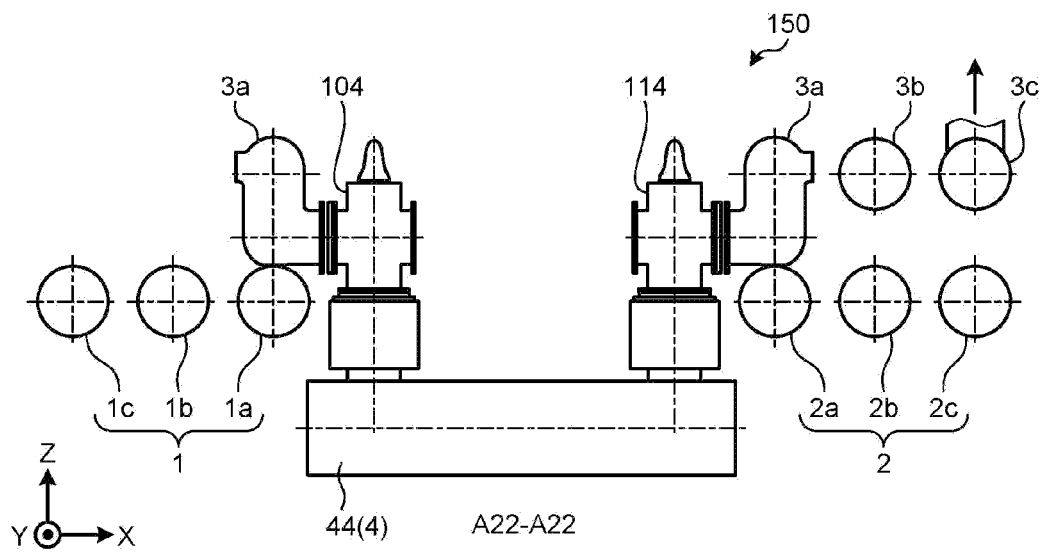
FIG. 17 is a cross-sectional view taken along line A22-A22 illustrated in FIG. 15.
Figure 18:
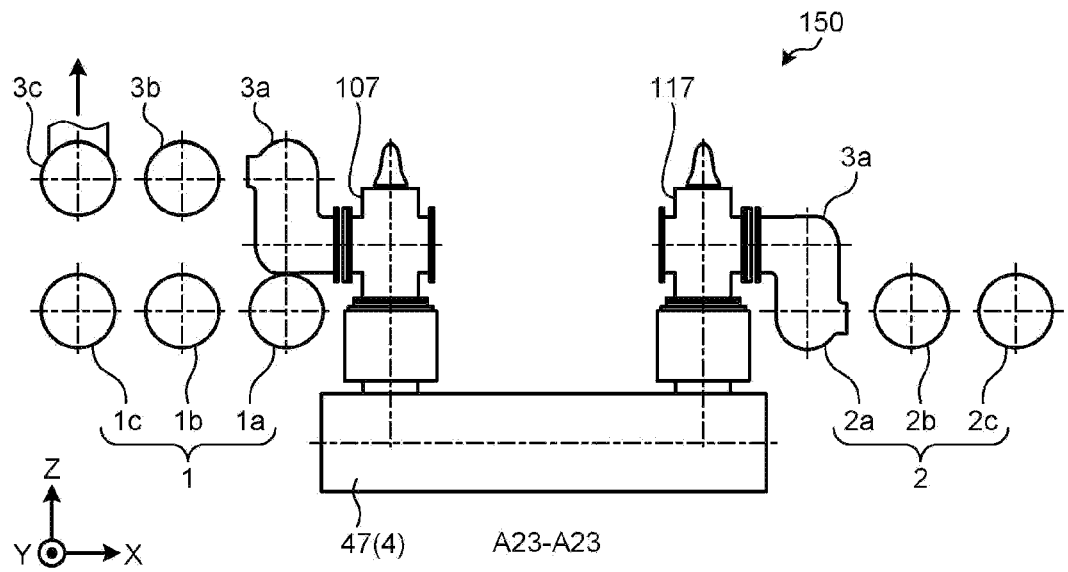
FIG. 18 is a cross-sectional view taken along line A23-A23 illustrated in FIG. 15.
Figure 19:
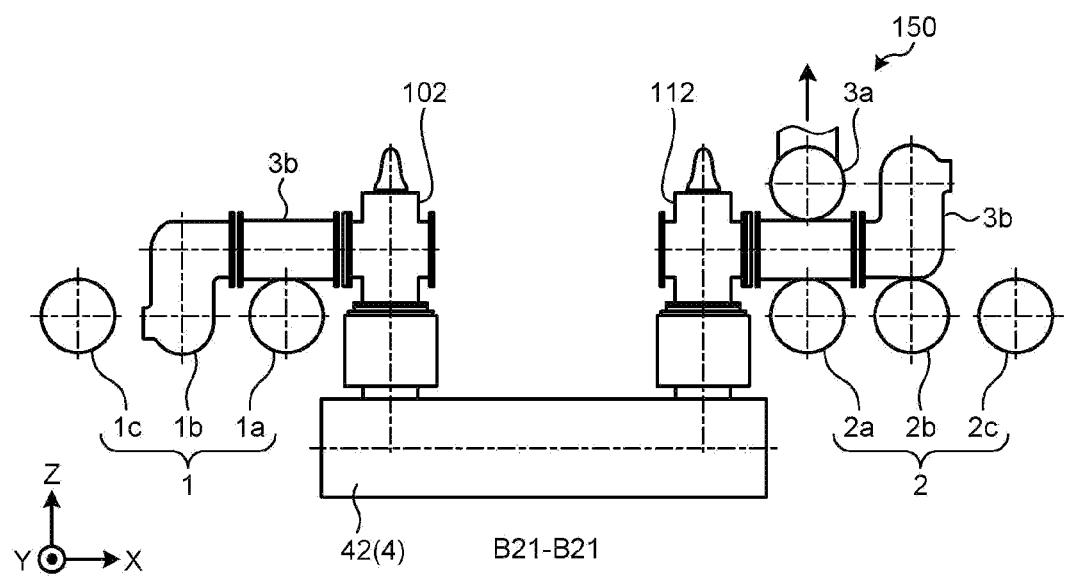
FIG. 19 is a cross-sectional view taken along line B21-B21 illustrated in FIG. 15.
Figure 20:
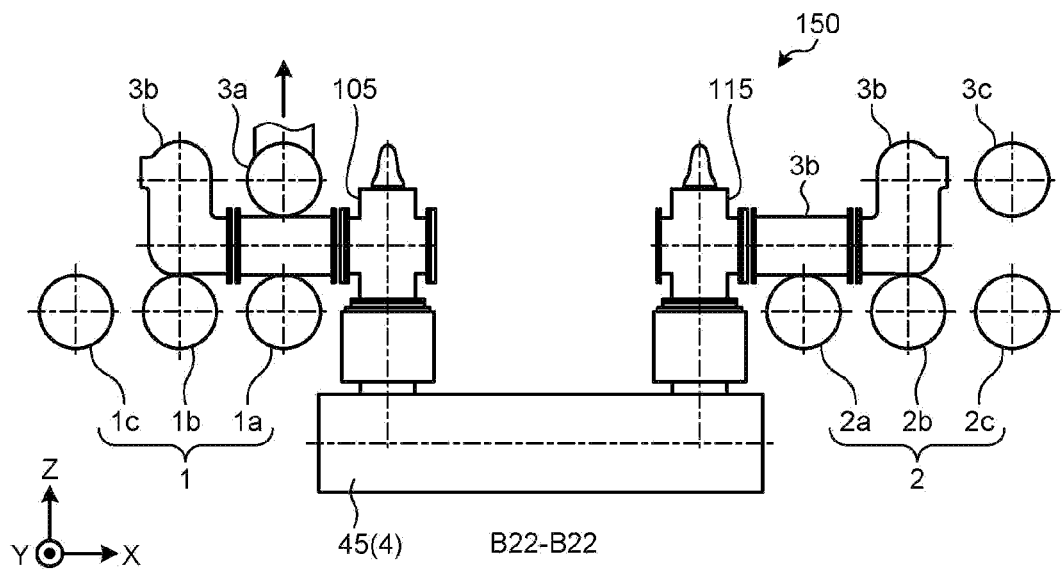
FIG. 20 is a cross-sectional view taken along line B22-B22 illustrated in FIG. 15.
Figure 21:
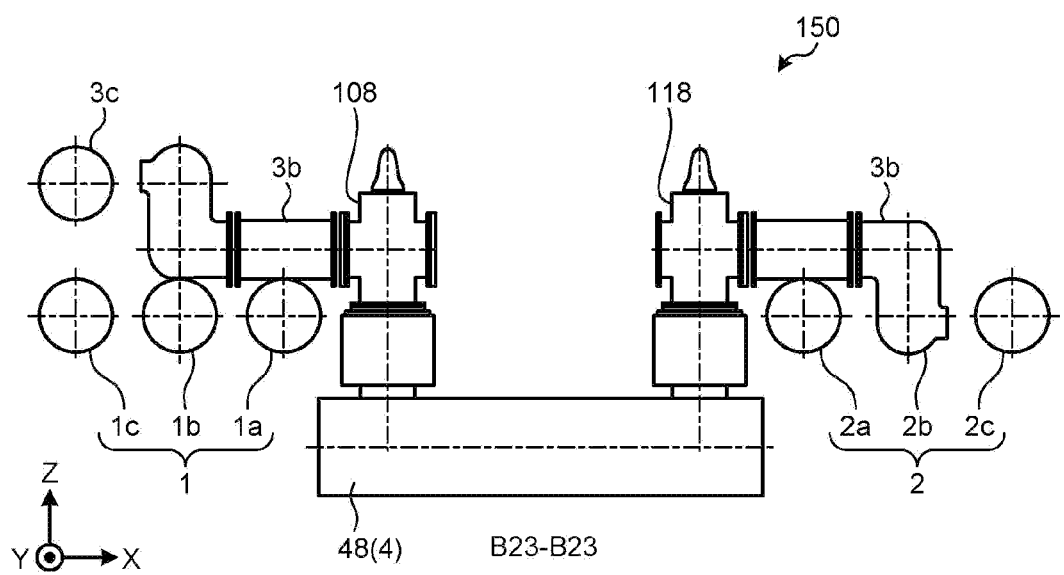
FIG. 21 is a cross-sectional view taken along line B23-B23 illustrated in FIG. 15.
Figure 22:
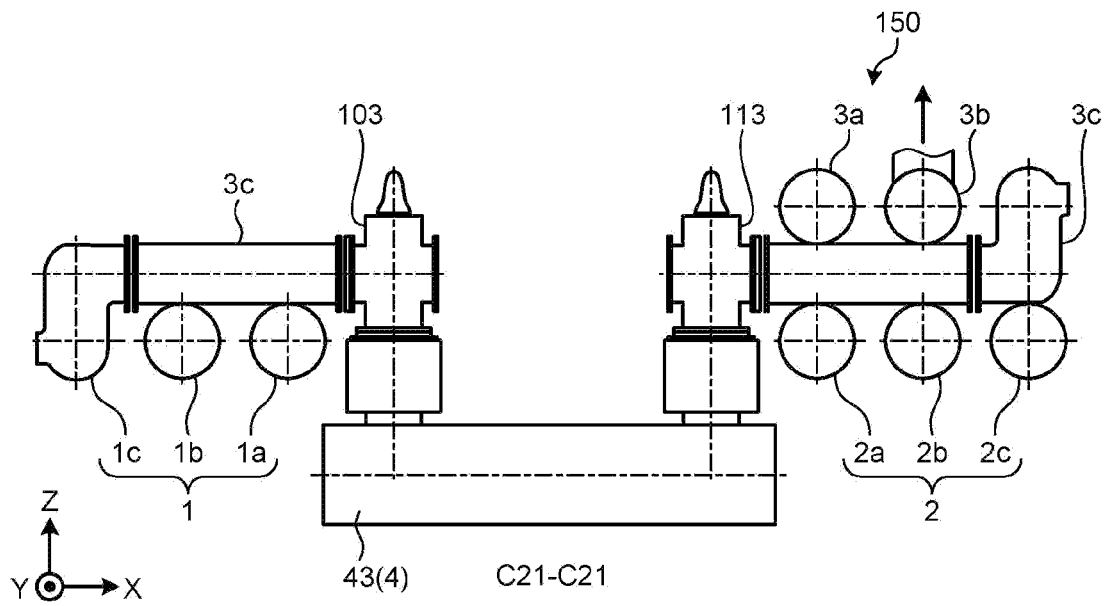
FIG. 22 is a cross-sectional view taken along line C21-C21 illustrated in FIG. 15.
Figure 23:
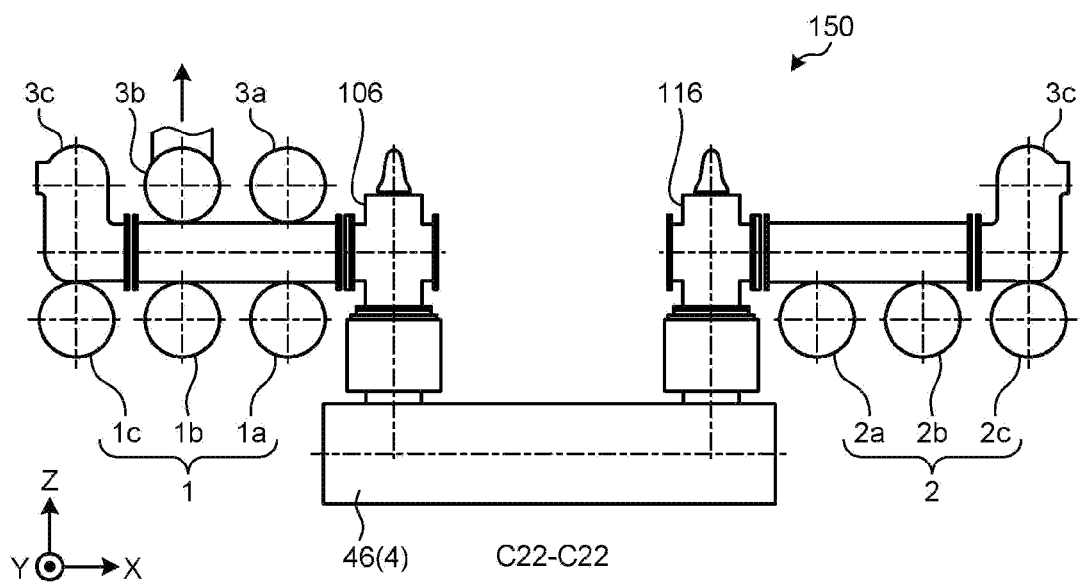
FIG. 23 is a cross-sectional view taken along line C22-C22 illustrated in FIG. 15.
Figure 24:
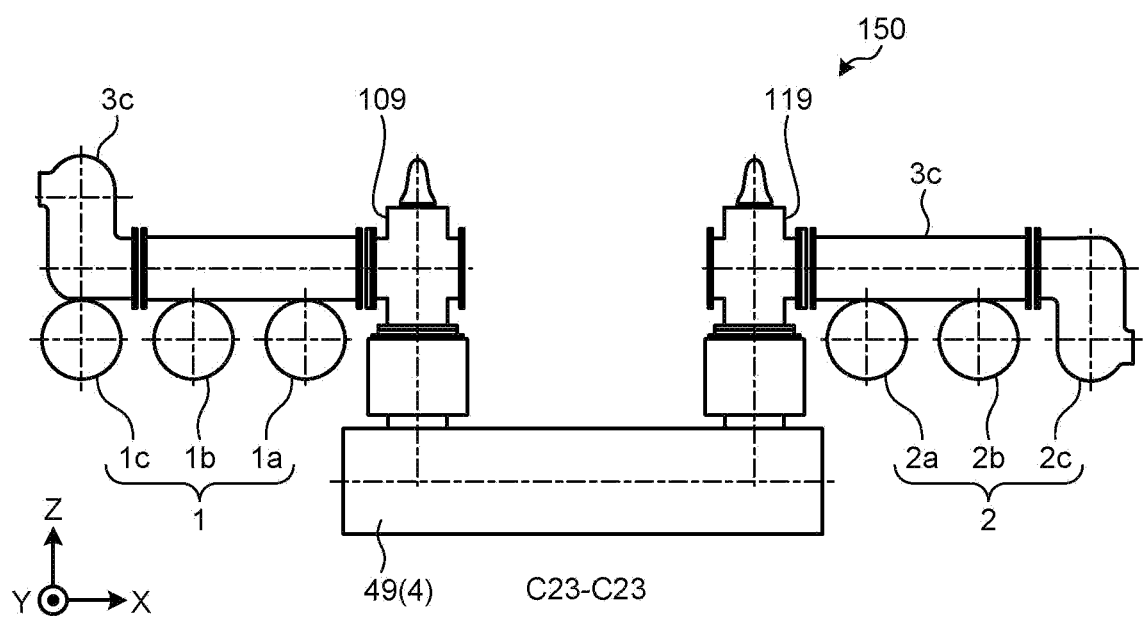
FIG. 24 is a cross-sectional view taken along line C23-C23 illustrated in FIG. 15.

Next, a gas-insulated switchgear according to a comparative example will be described. FIG. 14 is a diagram conceptually illustrating a schematic configuration of the gas-insulated switchgear 150 according to the comparative example. FIG. 15 is a plan view of the gas-insulated switchgear 150 illustrated in FIG. 14, mainly illustrating the layer including the connection busbars 3. FIG. 16 is a cross-sectional view taken along line A21-A21 illustrated in FIG. 15. FIG. 17 is a cross-sectional view taken along line A22-A22 illustrated in FIG. 15. FIG. 18 is a cross-sectional view taken along line A23-A23 illustrated in FIG. 15. FIG. 19 is a cross-sectional view taken along line B21-B21 illustrated in FIG. 15. FIG. 20 is a cross-sectional view taken along line B22-B22 illustrated in FIG. 15. FIG. 21 is a cross-sectional view taken along line B23-B23 illustrated in FIG. 15. FIG. 22 is a cross-sectional view taken along line C21-C21 illustrated in FIG. 15. FIG. 23 is a cross-sectional view taken along line C22-C22 illustrated in FIG. 15. FIG. 24 is a cross-sectional view taken along line C23-C23 illustrated in FIG. 15. The gas-insulated switchgear 150 according to the comparative example differs from the gas-insulated switchgear 50 according to the first embodiment in the paths of the connection busbars 3.

Specifically, the connection busbar 3*a* connecting the first other end rising portion 111 and the fourth other end rising portion 114, the connection busbar 3*b* connecting the second other end rising portion 112 and the fifth other end rising portion 115, and the connection busbar 3*c* connecting the third other end rising portion 113 and the sixth other end rising portion 116 pass on the right side of each of the other end rising portions 111-116.

The connection busbar 3*a* connecting the fourth one end rising portion 104 and the seventh one end rising portion 107, the connection busbar 3*b* connecting the fifth one end rising portion 105 and the eighth one end rising portion 108, and the connection busbar 3*c* connecting the sixth one end rising portion 106 and the ninth one end rising portion 109 pass on the left side of each of the one end rising portions 104-109.

Because the connection busbars 3 pass through the above paths, as illustrated in the conceptual diagram of FIG. 14, three connection busbars 3 pass on each side of the region between each of the one end rising portions 101-109 and each of the other end rising portions 111-119. Therefore, the lateral width of the region occupied by the connection busbars 3 is increased.

On the other hand, in the gas-insulated switchgear 50 according to the first embodiment, all the connection busbars 3 are located along the four lines, namely the first to fourth lines L1-L4, as described above. The second line L2 and the third line L3 of the first to fourth lines L1-L4 are provided between each of the one end rising portions 101-109 and each of the other end rising portions 111-119. Therefore, the lateral width of the region occupied by the connection busbars 3 can be reduced. Thus, in a case where the circuit breakers 4, each of the one end rising portions 101-109, each of the other end rising portions 111-119, and the connection busbars 3 are divided into preassembled units for transportation, the loading space required of the transport vehicle can be reduced. Consequently, the size of the transport vehicle can be reduced. In addition, the number of gas-insulated units in the divided state can be reduced to ease the burden of assembly work at the site where the gas-insulated switchgear 50 is installed.

Figure 25:
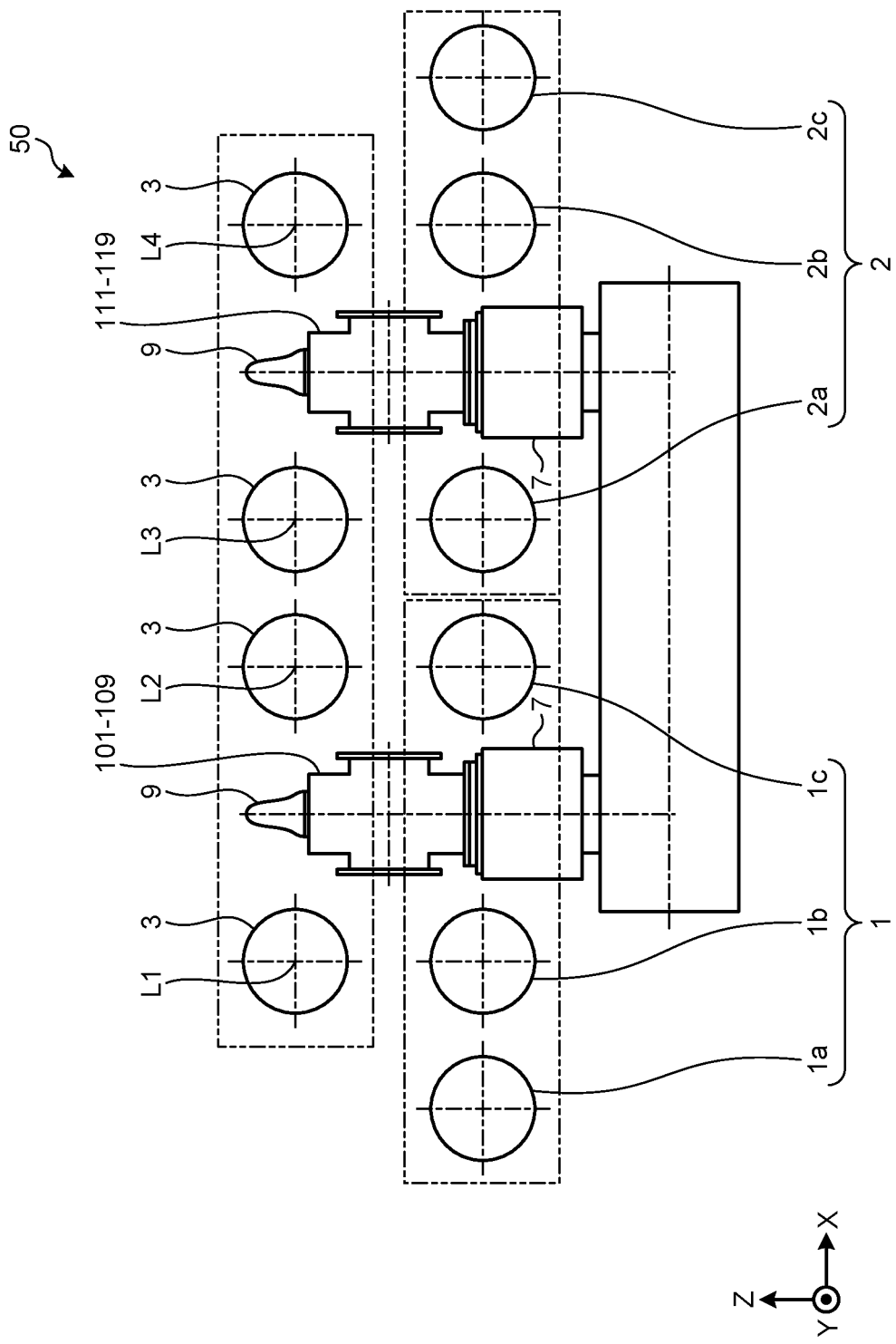
FIG. 25 is a diagram conceptually illustrating a schematic configuration of a gas-insulated switchgear according to a modification of the first embodiment.
Figure 26:
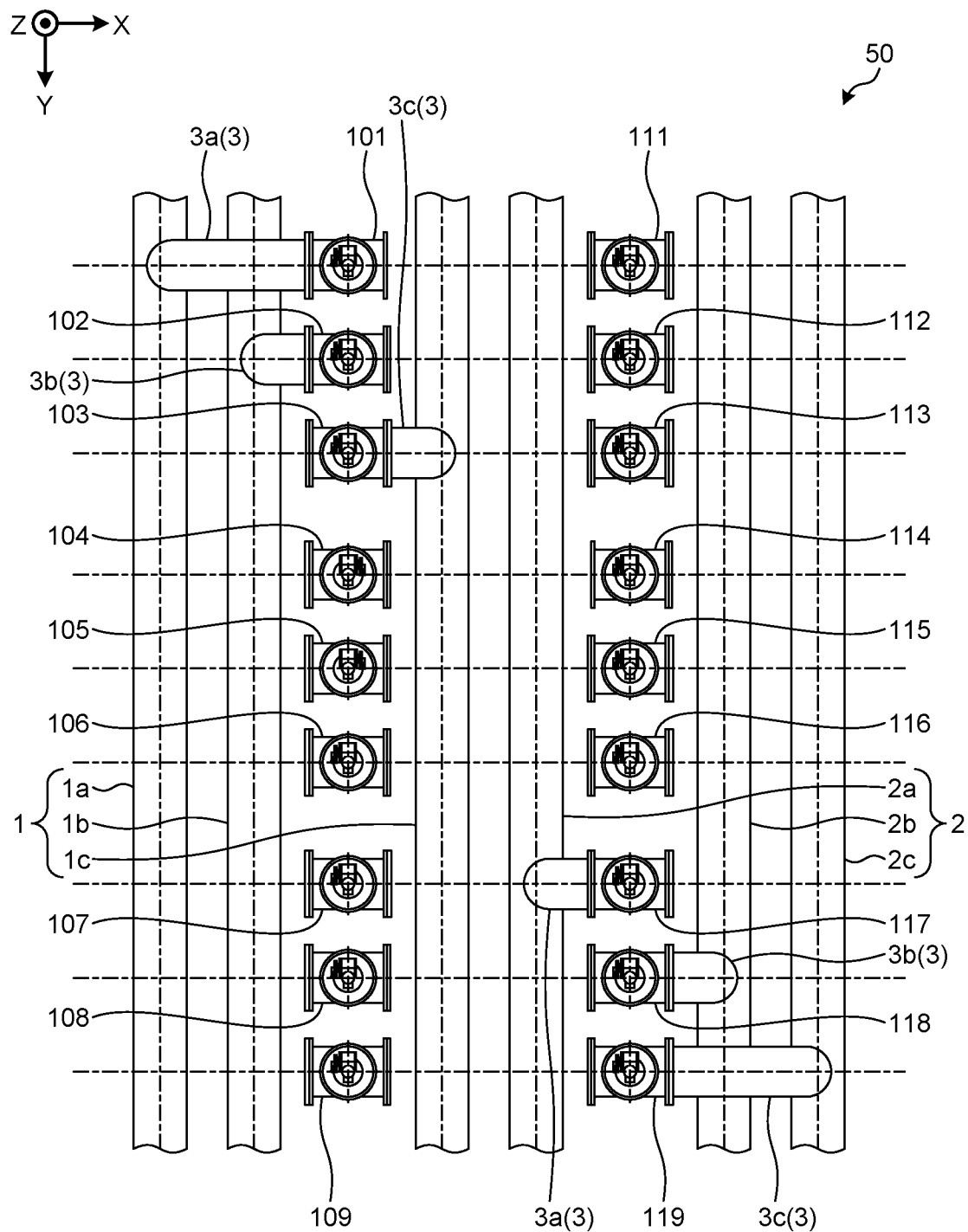
FIG. 26 is a plan view of the gas-insulated switchgear illustrated in FIG. 25, mainly illustrating the layer including main busbars.
Figure 27:
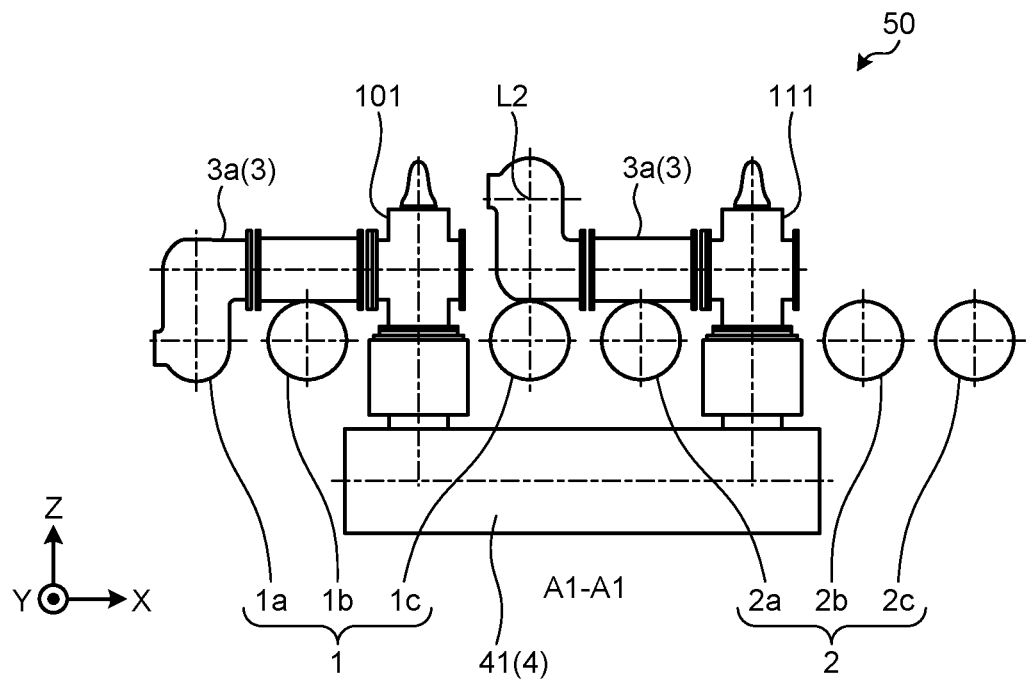
FIG. 27 is a cross-sectional view illustrating the gas-insulated switchgear according to the modification, corresponding to the cross-sectional view taken along line A1-A1 illustrated in FIG. 4.
Figure 28:
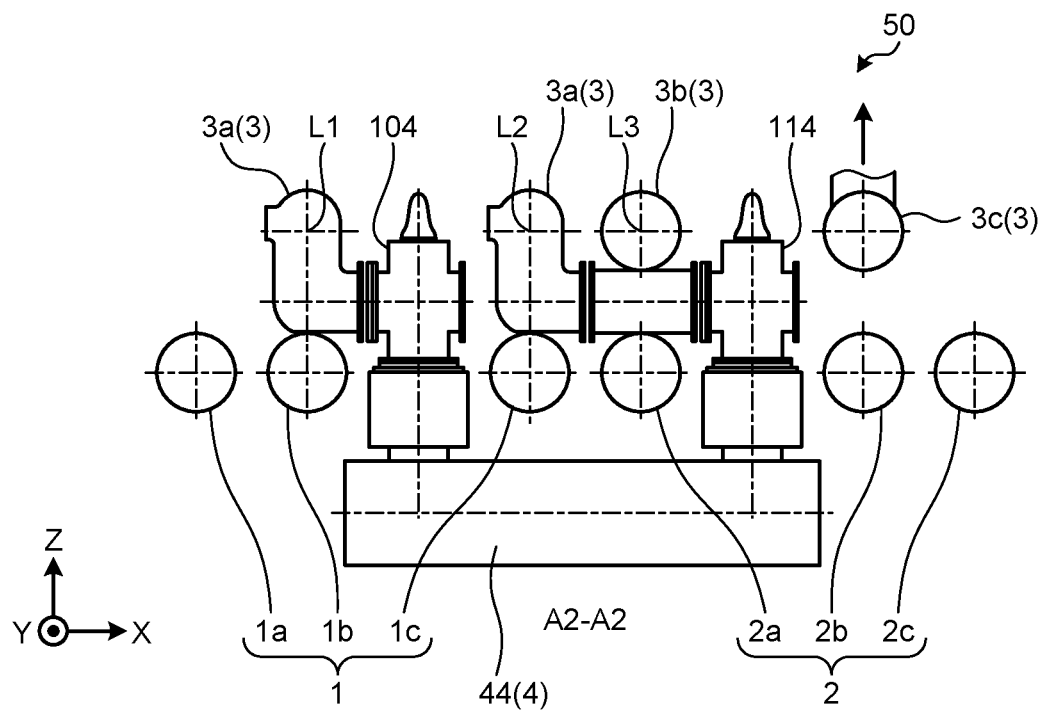
FIG. 28 is a cross-sectional view illustrating the gas-insulated switchgear according to the modification, corresponding to the cross-sectional view taken along line A2-A2 illustrated in FIG. 4.
Figure 29:
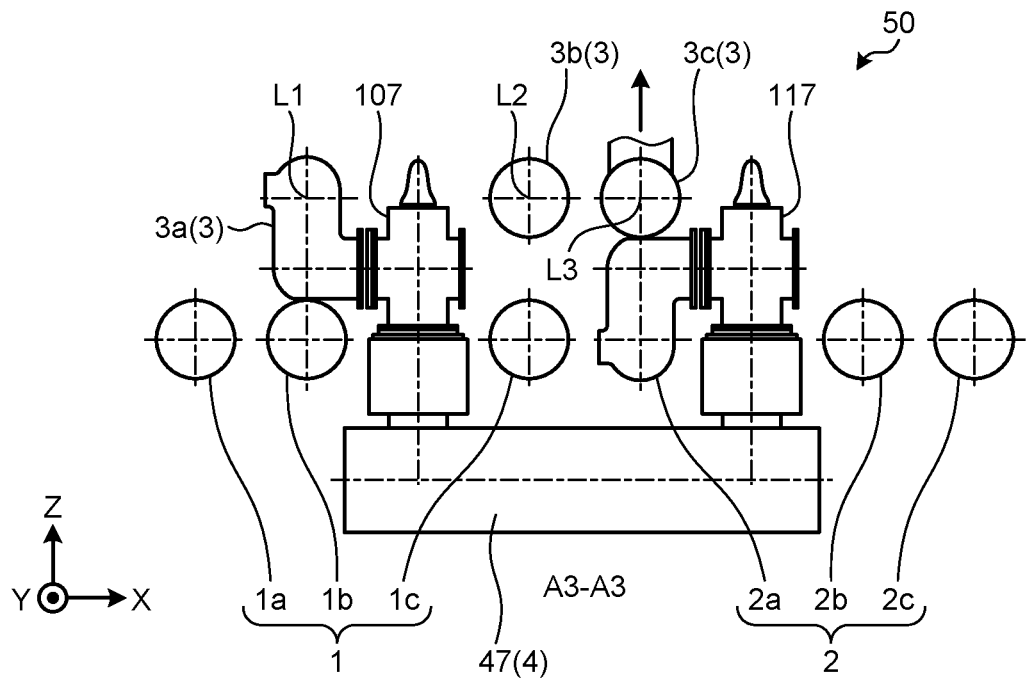
FIG. 29 is a cross-sectional view illustrating the gas-insulated switchgear according to the modification, corresponding to the cross-sectional view taken along line A3-A3 illustrated in FIG. 4.
Figure 30:
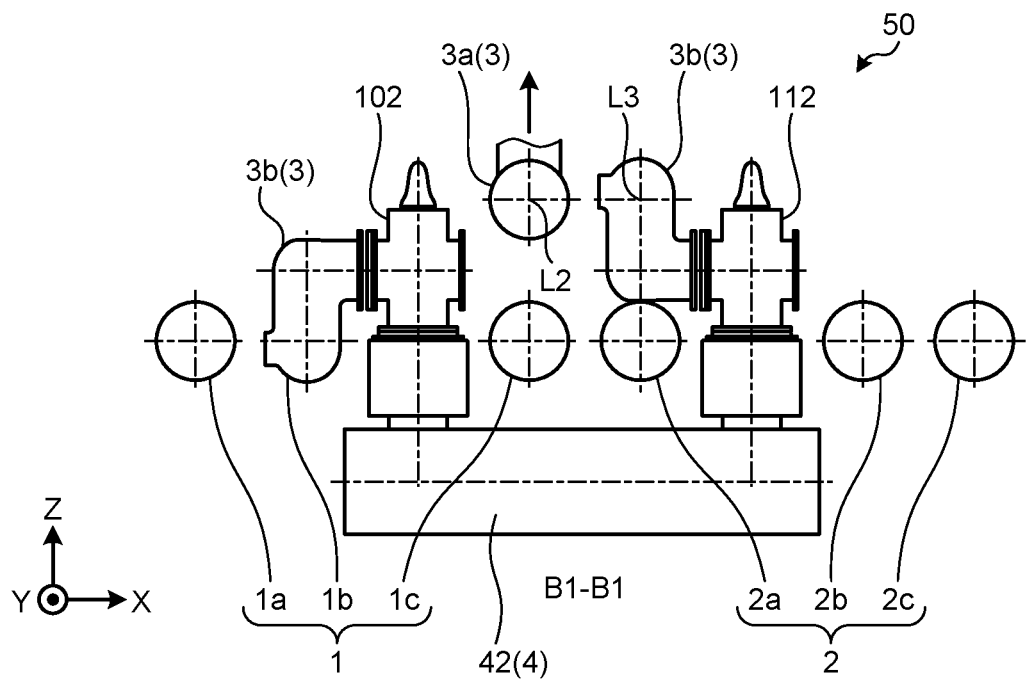
FIG. 30 is a cross-sectional view illustrating the gas-insulated switchgear according to the modification, corresponding to the cross-sectional view taken along line B1-B1 illustrated in FIG. 4.
Figure 31:
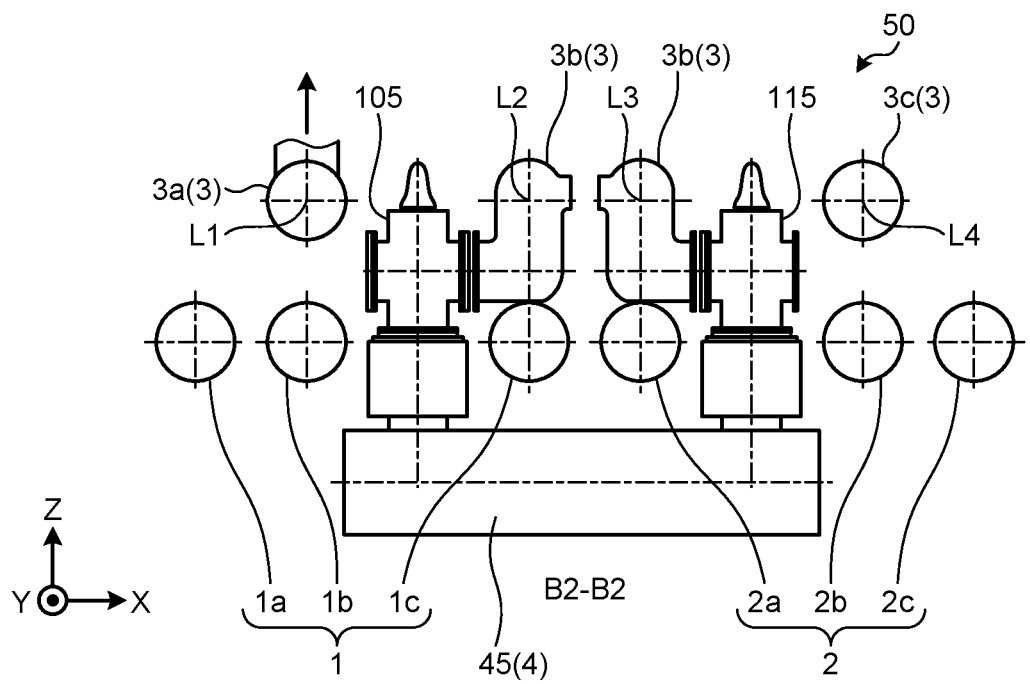
FIG. 31 is a cross-sectional view illustrating the gas-insulated switchgear according to the modification, corresponding to the cross-sectional view taken along line B2-B2 illustrated in FIG. 4.
Figure 32:
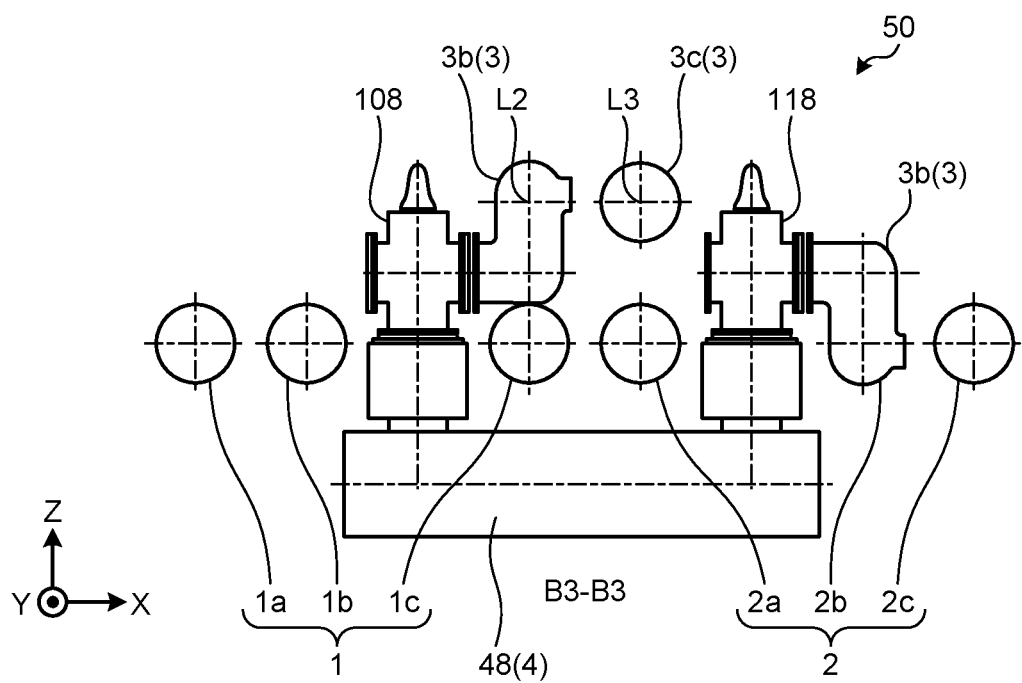
FIG. 32 is a cross-sectional view illustrating the gas-insulated switchgear according to the modification, corresponding to the cross-sectional view taken along line B3-B3 illustrated in FIG. 4.
Figure 33:
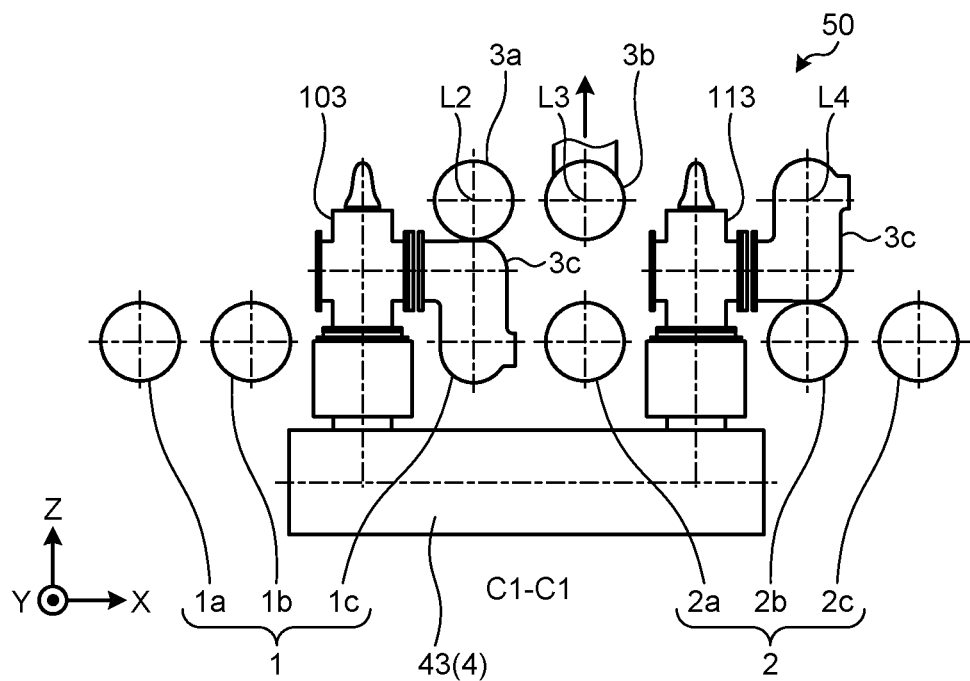
FIG. 33 is a cross-sectional view illustrating the gas-insulated switchgear according to the modification, corresponding to the cross-sectional view taken along line C1-C1 illustrated in FIG. 4.
Figure 34:
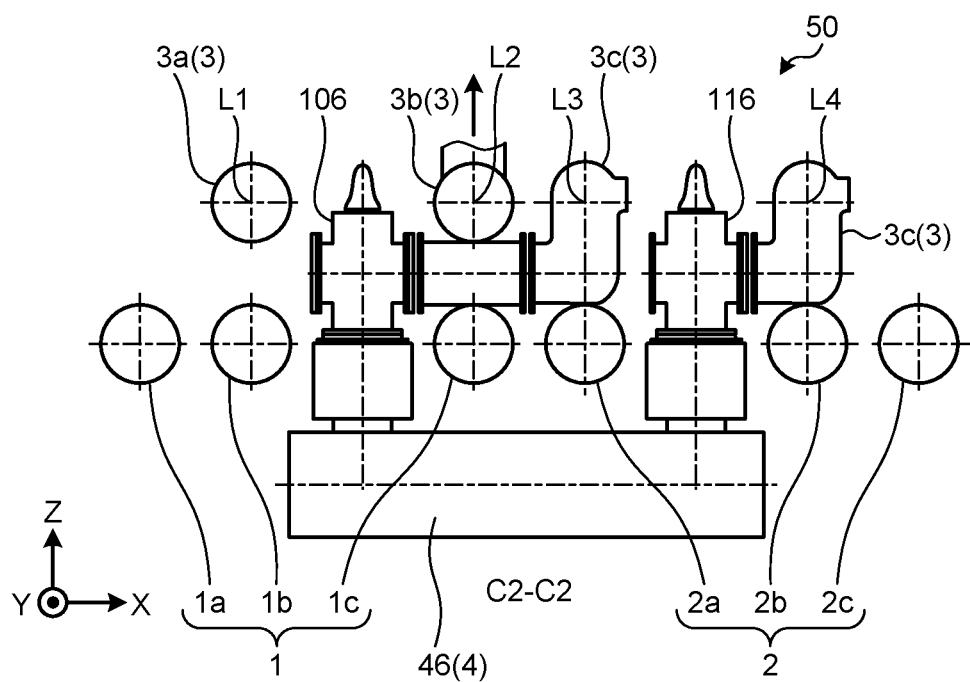
FIG. 34 is a cross-sectional view illustrating the gas-insulated switchgear according to the modification, corresponding to the cross-sectional view taken along line C2-C2 illustrated in FIG. 4.
Figure 35:
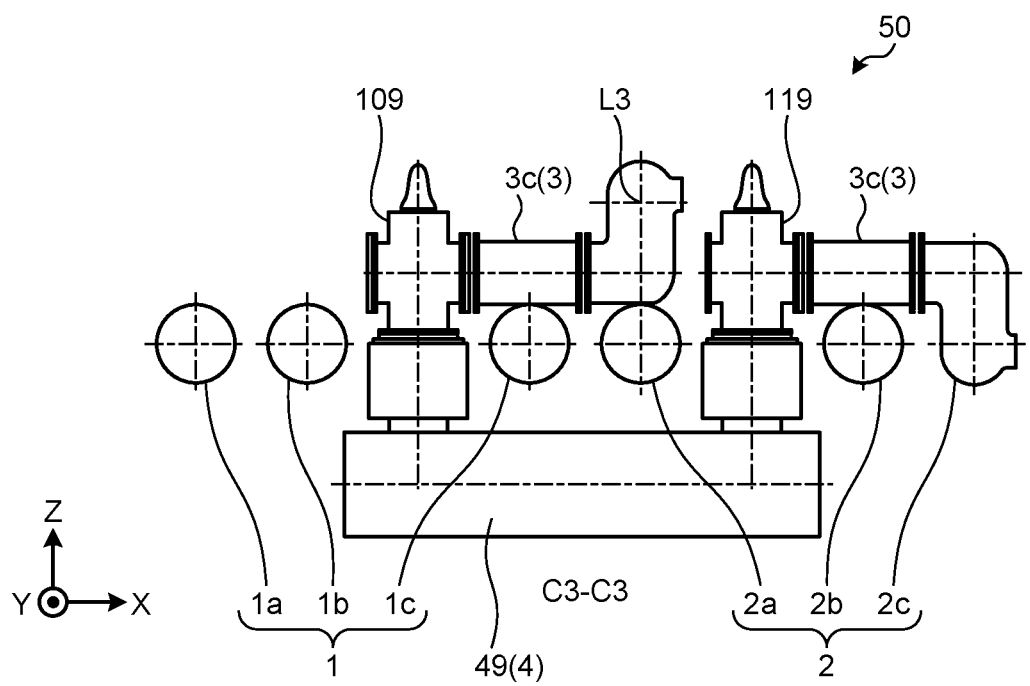
FIG. 35 is a cross-sectional view illustrating the gas-insulated switchgear according to the modification, corresponding to the cross-sectional view taken along line C3-C3 illustrated in FIG. 4.

Next, the gas-insulated switchgear 50 according to a modification of the first embodiment will be described. FIG. 25 is a diagram conceptually illustrating a schematic configuration of the gas-insulated switchgear 50 according to the modification of the first embodiment. FIG. 26 is a plan view of the gas-insulated switchgear 50 illustrated in FIG. 25, mainly illustrating the layer including the main busbars 1 and 2. FIG. 27 is a cross-sectional view illustrating the gas-insulated switchgear 50 according to the modification, corresponding to the cross-sectional view taken along line A1-A1 illustrated in FIG. 4. FIG. 28 is a cross-sectional view illustrating the gas-insulated switchgear 50 according to the modification, corresponding to the cross-sectional view taken along line A2-A2 illustrated in FIG. 4. FIG. 29 is a cross-sectional view illustrating the gas-insulated switchgear 50 according to the modification, corresponding to the cross-sectional view taken along line A3-A3 illustrated in FIG. 4. FIG. 30 is a cross-sectional view illustrating the gas-insulated switchgear 50 according to the modification, corresponding to the cross-sectional view taken along line B1-B1 illustrated in FIG. 4. FIG. 31 is a cross-sectional view illustrating the gas-insulated switchgear 50 according to the modification, corresponding to the cross-sectional view taken along line B2-B2 illustrated in FIG. 4. FIG. 32 is a cross-sectional view illustrating the gas-insulated switchgear 50 according to the modification, corresponding to the cross-sectional view taken along line B3-B3 illustrated in FIG. 4. FIG. 33 is a cross-sectional view illustrating the gas-insulated switchgear 50 according to the modification, corresponding to the cross-sectional view taken along line C1-C1 illustrated in FIG. 4. FIG. 34 is a cross-sectional view illustrating the gas-insulated switchgear 50 according to the modification, corresponding to the cross-sectional view taken along line C2-C2 illustrated in FIG. 4. FIG. 35 is a cross-sectional view illustrating the gas-insulated switchgear 50 according to the modification, corresponding to the cross-sectional view taken along line C3-C3 illustrated in FIG. 4.

In the gas-insulated switchgear 50 according to the modification, the paths of the main busbars 1 and 2 are different from those illustrated in FIG. 3 and the like. Specifically, the C-phase main busbar 1*c* and the A-phase main busbar 2*a* pass through the region between each of the one end rising portions 101-109 and each of the other end rising portions 111-119. The C-phase main busbar 1*c* passes below the second line L2, and the A-phase main busbar 2*a* passes below the third line L3.

As illustrated in FIG. 27, the connection busbar 3*a* branching from the A-phase main busbar 1*a* is connected to the left side of the first one end rising portion 101. As illustrated in FIG. 30, the connection busbar 3*b* branching from the B-phase main busbar 1*b* is connected to the left side of the second one end rising portion 102. As illustrated in FIG. 33, the connection busbar 3*c* branching from the C-phase main busbar 1*c* is connected to the right side of the third one end rising portion 103. As illustrated in FIG. 29, the connection busbar 3*a* branching from the A-phase main busbar 2*a* is connected to the left side of the seventh other end rising portion 117. As illustrated in FIG. 32, the connection busbar 3*b* branching from the B-phase main busbar 2*b* is connected to the right side of the eighth other end rising portion 118. As illustrated in FIG. 35, the connection busbar 3*c* branching from the C-phase main busbar 2*c* is connected to the right side of the ninth other end rising portion 119. Note that the paths of the connection busbars 3 are the same as those illustrated in FIGS. 4 to 13.

In the gas-insulated switchgear 50 according to the modification, the C-phase main busbar 1*c* and the A-phase main busbar 2*a*, which are two out of the six main busbars 1 and 2, are located in the region between each of the one end rising portions 101-109 and each of the other end rising portions 111-119. Therefore, the lateral width of the layer including the main busbars 1 and 2 can also be reduced. Consequently, the installation area for the gas-insulated switchgear 50 can be reduced. Thus, space saving can be achieved in a substation or the like where the gas-insulated switchgear 50 is installed. In the present modification, the C-phase main busbar 1*c* and the A-phase main busbar 2*a*, which are the third main busbar and the fourth main busbar, respectively, are located in the region between each of the one end rising portions 101-109 and each of the other end rising portions 111-119. However, a different combination of main busbars may be located in the region between each of the one end rising portions 101-109 and each of the other end rising portions 111-119. Any one of the three main busbars 1 and any one of the three main busbars 2 can be selected and located in the region between each of the one end rising portions 101-109 and each of the other end rising portions 111-119.

The configuration described in the above-mentioned embodiment indicates an example of the contents of the present invention. The configuration can be combined with another well-known technique, and a part of the configuration can be omitted or changed in a range not departing from the gist of the present invention.

REFERENCE SIGNS LIST

1, 2 main busbar; 1*a*, 2*a* A-phase main busbar; 1*b*, 2*b* B-phase main busbar; 1*c*, 2*c* C-phase main busbar; 3, 3*a*, 3*b*, 3*c* connection busbar; 4 circuit breaker; 5, 6 lead-out busbar; 7 instrument current transformer; 8 disconnector; 9 ground switch; 41 first circuit breaker; 42 second circuit breaker; 43 third circuit breaker; 44 fourth circuit breaker; 45 fifth circuit breaker; 46 sixth circuit breaker; 47 seventh circuit breaker; 48 eighth circuit breaker; 49 ninth circuit breaker; 50, 150 gas-insulated switchgear; 101 first one end rising portion; 102 second one end rising portion; 103 third one end rising portion; 104 fourth one end rising portion; 105 fifth one end rising portion; 106 sixth one end rising portion; 107 seventh one end rising portion; 108 eighth one end rising portion; 109 ninth one end rising portion; 111 first other end rising portion; 112 second other end rising portion; 113 third other end rising portion; 114 fourth other end rising portion; 115 fifth other end rising portion; 116 sixth other end rising portion; 117 seventh other end rising portion; 118 eighth other end rising portion; 119 ninth other end rising portion

The invention claimed is:

1. A gas-insulated switchgear comprising:

first to ninth circuit breakers extending along a first direction and aligned in rows along a second direction perpendicular to the first direction;

first to ninth one end rising portions respectively raised from one end of the first to ninth circuit breakers along a third direction perpendicular to the first direction and the second direction;

first to ninth other end rising portions respectively raised from another end of the first to ninth circuit breakers along the third direction;

a first connection busbar connecting the first other end rising portion and the fourth other end rising portion;

a second connection busbar connecting the second other end rising portion and the fifth other end rising portion;

a third connection busbar connecting the third other end rising portion and the sixth other end rising portion;

a fourth connection busbar connecting the fourth one end rising portion and the seventh one end rising portion;

a fifth connection busbar connecting the fifth one end rising portion and the eighth one end rising portion; and a sixth connection busbar connecting the sixth one end rising portion and the ninth one end rising portion, wherein when a first line parallel to the second direction is set adjacent to each of the one end rising portions on a side farther from each of the other end rising portions, a second line parallel to the second direction is set between each of the one end rising portions and each of the other end rising portions, a third line parallel to the second direction is set closer to each of the other end rising portions than the second line, the third line being set between each of the one end rising portions and each of the other end rising portions, and a fourth line parallel to the second direction is set adjacent to each of the other end rising portions on a side farther from each of the one end rising portions, the first connection busbar passes through the second line, is connected to one side of the first other end rising portion closer to the first one end rising portion, and is connected to one side of the fourth other end rising portion closer to the fourth one end rising portion, the second connection busbar passes through the third line, is connected to one side of the second other end rising portion closer to the second one end rising portion, and is connected to one side of the fifth other end rising portion closer to the fifth one end rising portion, the third connection busbar passes through the fourth line, is connected to one side of the third other end rising portion farther from the third one end rising portion, and is connected to one side of the sixth other end rising portion farther from the sixth one end rising portion, the fourth connection busbar passes through the first line, is connected to one side of the fourth one end rising portion farther from the fourth other end rising portion, and is connected to one side of the seventh one end rising portion farther from the seventh other end rising portion, the fifth connection busbar passes through the second line, is connected to one side of the fifth one end rising portion closer to the fifth other end rising portion, and is connected to one side of the eighth one end rising portion closer to the eighth other end rising portion, and the sixth connection busbar passes through the third line, is connected to one side of the sixth one end rising portion closer to the sixth other end rising portion, and is connected to one side of the ninth one end rising portion closer to the ninth other end rising portion.

2. The gas-insulated switchgear according to claim 1, further comprising:
a first main busbar extending along the second direction and connected to the first one end rising portion;
a second main busbar extending along the second direction and connected to the second one end rising portion;
a third main busbar extending along the second direction and connected to the third one end rising portion;
a fourth main busbar extending along the second direction and connected to the seventh other end rising portion;
a fifth main busbar extending along the second direction and connected to the eighth other end rising portion; and
a sixth main busbar extending along the second direction and connected to the ninth other end rising portion, wherein
one of the first to third main busbars and one of the fourth to sixth main busbars pass through a region between each of the one end rising portions and each of the other end rising portions.

3. The gas-insulated switchgear according to claim 2, further comprising a ground switch and an instrument current transformer provided on each of the first to ninth one end rising portions and the first to ninth other end rising portions.

4. The gas-insulated switchgear according to claim 1, further comprising a ground switch and an instrument current transformer provided on each of the first to ninth one end rising portions and the first to ninth other end rising portions.

* * * * *